(12) United States Patent
Imai

(10) Patent No.: US 8,201,200 B2
(45) Date of Patent: Jun. 12, 2012

(54) STORAGE MEDIUM STORING AN INFORMATION PROCESSING PROGRAM AND INFORMATION PROCESSING APPARATUS

(75) Inventor: Daiji Imai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 431 days.

(21) Appl. No.: 12/340,828

(22) Filed: Dec. 22, 2008

(65) Prior Publication Data

US 2009/0178080 A1    Jul. 9, 2009

(30) Foreign Application Priority Data

Jan. 9, 2008   (JP) .................................. 2008-002498

(51) Int. Cl.
*H04N 5/445* (2011.01)
*G06F 3/00* (2006.01)

(52) U.S. Cl. ............... 725/44; 725/40; 725/43; 725/45; 725/53

(58) Field of Classification Search .................... 725/40, 725/43, 45, 53; 715/275
See application file for complete search history.

(56) References Cited

U.S. PATENT DOCUMENTS 7,574,659 B2 * 8/2009 Szabo ........................... 715/738
2002/0069218 A1 * 6/2002 Sull et al. .................... 707/501.1

FOREIGN PATENT DOCUMENTS

JP    2003-32568    1/2003

* cited by examiner

*Primary Examiner* — Kieu Oanh T Bui
(74) *Attorney, Agent, or Firm* — Nixon & Vanderhye P.C.

(57) ABSTRACT

An information processing apparatus has a plurality of display information, with respect to selected display information, displays a content part including a plurality of contents, and displays an index part of the other display information. In a case that an electronic program guide is displayed, as a content part, a program guide including a plurality of program information is displayed, and as an index part, date tubs are displayed. When a search condition is designated, it is determined whether or not program information matching the search condition is present. In the displayed program guide, a display manner of the program information matching the search condition is changed, and with respect to the index part, a display manner of the date tub corresponding to the program information matching the search condition is changed, for example.

23 Claims, 23 Drawing Sheets

FIG. 23
(A)
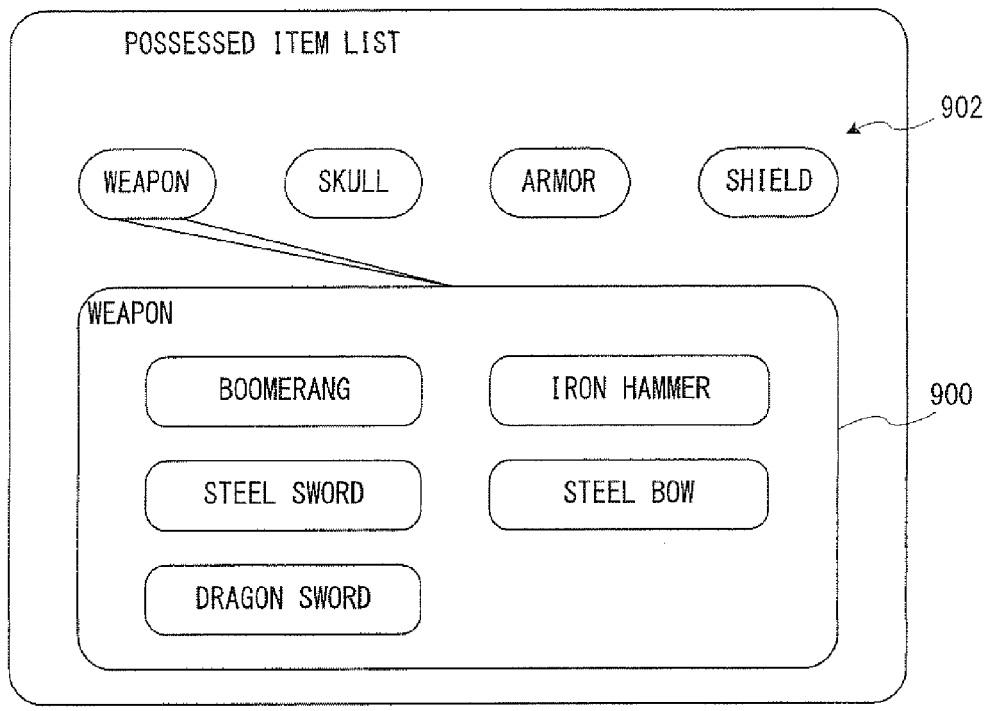
(B)
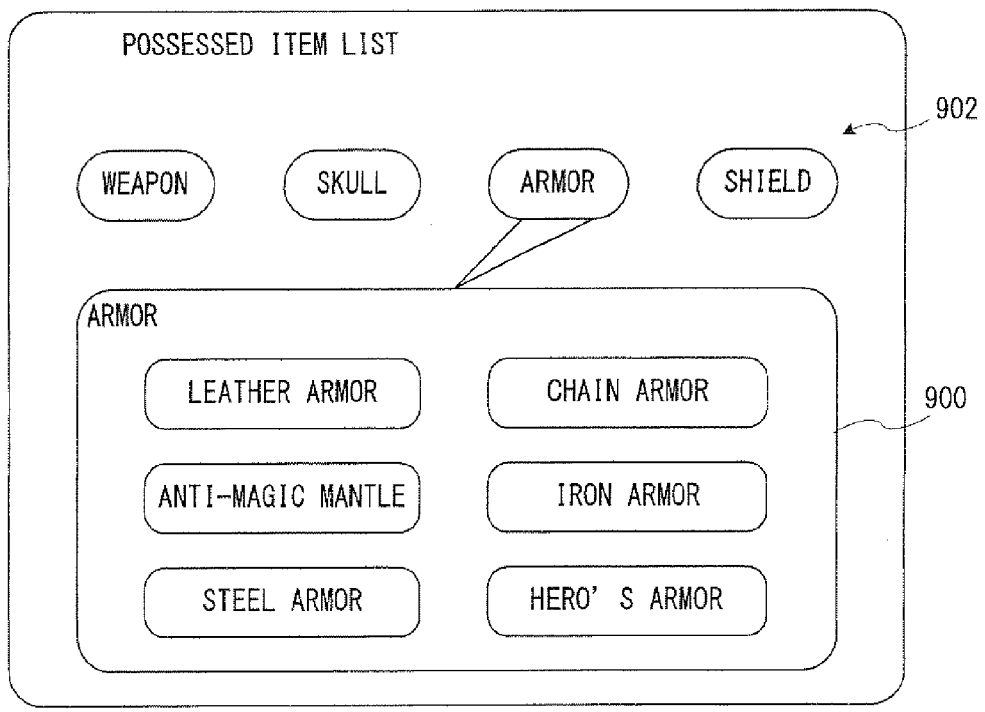

FIG. 24
(A)
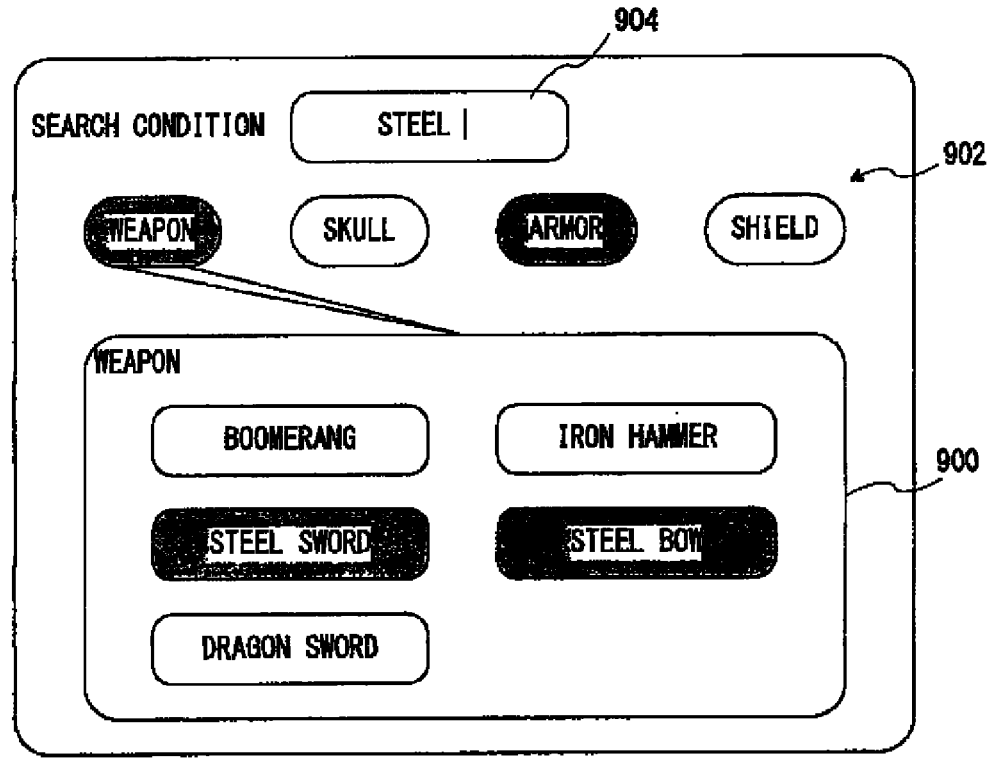
(B)
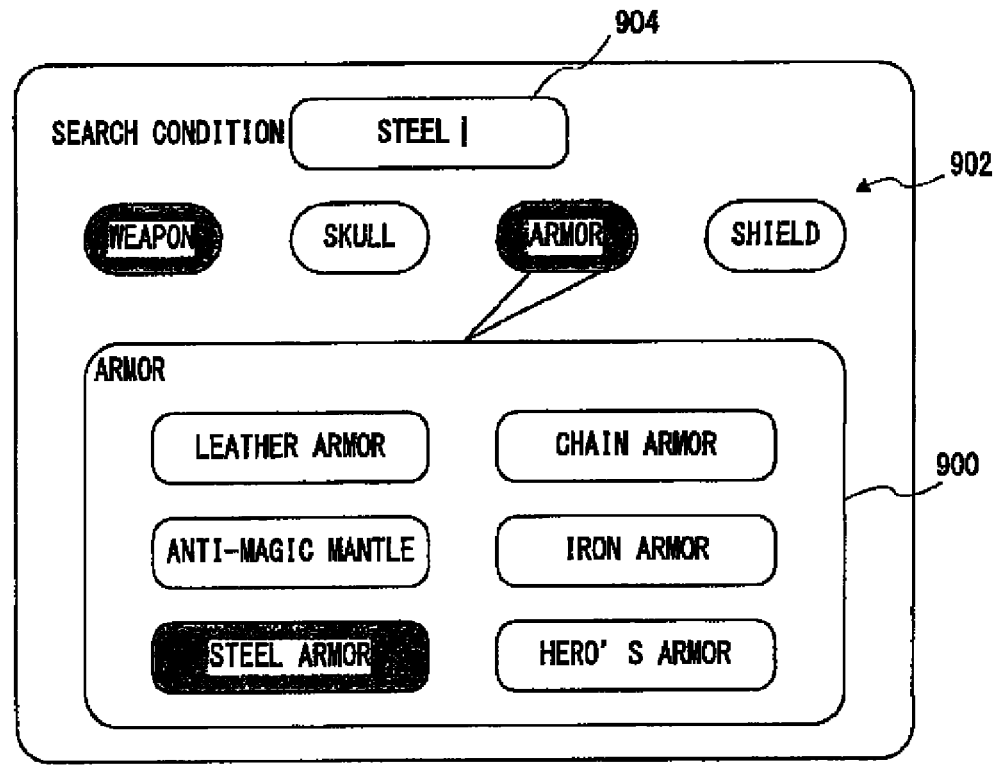

STORAGE MEDIUM STORING AN INFORMATION PROCESSING PROGRAM AND INFORMATION PROCESSING APPARATUS

CROSS REFERENCE OF RELATED APPLICATION

The disclosure of Japanese Patent Application No. 2008-2498 is incorporated herein by reference.

FIELD

The technology herein relates to a storage medium storing an information processing program and an information processing apparatus. More specifically, the technology relates to a storage medium storing an information processing program to display a search result of a content in an information processing apparatus provided with a plurality of display information including a content part including a plurality of contents and an index part for displaying an index of each of the plurality of contents, and the information processing apparatus.

BACKGROUND AND SUMMARY

Conventionally, it is well known that in various information processing equipment, a plurality of contents are classified into groups, and an index is applied for each group, and by selecting the index, the content of the corresponding group is switched to be displayed. In such equipment, some equipment identify and display a content matching a search condition out of the contents displayed on the screen when a search of the content is performed by the user.

For example, in a system of displaying an electronic program guide of a television program disclosed in a Patent Document 1 (Japanese Patent Application Laid-Open No. 2003-32568 [H04N 5/445, H04B 1/16, H04N 5/44 5/76]), a plurality of two-dimensional maps being brought into association with a channel group selecting tab and a time group selecting tab are formed as a user interface that the user designates a displaying portion of the electronic program guide, and the two-dimensional map is switched by selecting a tab. When a program is searched, a mark is displayed at a position corresponding to the channel and the time slot of the program corresponding to the search condition in the two-dimensional map corresponding to the tub which is currently being selected. Furthermore, on the two-dimensional maps corresponding to tabs other than the tab which is currently being selected, the search is performed, and if a further tab is clicked, and a further two-dimensional map corresponding thereto is displayed, a similar mark is displayed at a position corresponding to the channel and the time slot of the program corresponding to the search condition.

However, in the above-described Patent Document 1, there is a disadvantage of knowing whether or not a program matching the search condition is present on another two-dimensional map of a tab which is not selected only after the tab is selected to display the two-dimensional map.

Therefore, certain example embodiments provide a novel storage medium storing an information processing program and a novel information processing apparatus.

Certain example embodiments provide a storage medium storing an information processing program and an information processing apparatus capable of easily determining whether or not a content matching a search condition is present with respect to not only the information whose content is being displayed but also other information whose content is not displayed.

Embodiments herein may employ the following features in order to solve the above-described problems. It should be noted that reference numerals and the supplements inside the parentheses show one example of a corresponding relationship with the embodiments described later for easy understanding the described embodiments, and do not limit the present invention.

A first embodiment includes a storage medium storing an information processing program to be executed by a computer of an information processing apparatus having a plurality of display information including a content part which includes a plurality of contents and an index part which indicates indexes of the plurality of contents. The information processing program causes a computer to execute a first display controlling step, a search condition designating step, a content determining step, and a second display controlling step. The first display controlling step displays at least a content part of the display information arbitrarily selected out of the plurality of display information and displays an index part of the other display information. The search condition designating step designates a search condition to search an arbitrary content from the plurality of contents. The content determining step determines whether or not a content matching the search condition is present. The second display controlling step changes a display manner of the content which is included in the content part displayed by the first display controlling step and determined to match the search condition by the content determining step, and changes a display manner of the index part displayed by the first display controlling step in correspondence to a determination result by the content determining step.

In example embodiments, an information processing program is to be executed by a computer (40) of an information processing apparatus (10, 12) having a plurality of display information. The display information is information to be displayed on the display (34), and includes a content part (700, 900) including a plurality of contents and an index part (702, 902) including indexes of the plurality of contents. For example, in a case that the information processing program is a program of an application for displaying an electronic program guide, the content may be program information, and the index may be a date, a broadcast station, a time, or the like. Furthermore, in a case that the information processing program is a game program, the content may be an item, and the index may be a kind of the item. In a first display controlling step (S31-S35, S91, S95, S107-S115), out of the plurality of display information, with respect to the display information arbitrarily selected, at least a content part is displayed, and with respect to the other display information, an index part is displayed. The content part to be displayed may be selected by a user, decided in advance, or the content part corresponding to predetermined data (current date and time, etc.) may be selected. In a search condition designating step (S1-S5), a search condition for searching an arbitrary content from the plurality of contents is designated, for example. As a search condition, a kind of the content may be selected, a character string may be input, or a character string may be selected from the displayed content, for example. In a content determining step (S7, S57, S59), whether or not a content matching the search condition is present. In a second display controlling step (S93, S99, S101), a display manner of the content which is included in the displayed content part and determined to match the search condition is changed, and a display manner of the displayed index part is changed in correspondence to a determination result by the content determining step. For example, a display manner of the index part corresponding to the content matching the search condition may be changed, or an index part which does not correspond to the content matching the search condition may be erased.

According to certain embodiments, in the displayed content part, a content matching the search condition can clearly be shown, and in the displayed index part, an index part corresponding to the content matching the search condition can clearly shown. Thus, it is possible to easily determine whether or not a content matching the search condition is present for both of the display information displayed with a content and the display information not displayed with a content.

A second embodiment includes a storage medium storing an information processing program according to the first embodiment, and the second display controlling step changes a display manner of the index part corresponding to the content which is determined to match the search condition by the content determining step.

In certain example embodiments, in a second display controlling step, a display manner of the index part corresponding to the content which is determined to match the search condition is changed. Accordingly, with respect to the display information displayed with a content matching the search condition, the display of the content can be changed, and with respect to the display information displayed with an index part corresponding to the content matching the search condition, the display of the index part can be changed, and therefore, it is possible to easily determine a content matching the search condition with respect to the plurality of displayed contents, and it is possible to easily determine an index part corresponding to the content matching the search condition with respect to the displayed index part.

Other embodiments include a storage medium storing an information processing program according to other embodiments, and the content determining step includes a coincidence judging step for determining whether or not the search condition and each of the plurality of contents are coincident with each other and a marking step for marking the content which is determined to be coincident with the coincidence judging step. The second display controlling step, with respect to the display information in which the marked content is included in the content part displayed by the first display controlling step, changes a display manner of the content, and with respect to the display information in which the marked content is included in the content part corresponding to the index part displayed by the first display controlling step, changes a display manner of the index part.

In certain example embodiments, in a coincidence judging step (S57), it is determined whether or not the search condition and each content are coincident with each other, and in a marking step (S59), the content which is determined to be coincident is marked. In the second display controlling step, in the displayed content part, the display manner of the marked content is changed, and in the displayed index part, a display manner of the index part corresponding to the marked content is changed. Accordingly, it is possible to easily determine whether or not a content matching the search condition is present for each of the plurality of display information.

Example embodiments include a storage medium storing an information processing program according to certain embodiments, and the first display controlling step displays only the content part with respect to the selected display information, and displays only the index part with respect to the other display information.

Certain example embodiments include, by the first display controlling step, with respect to the display information selected out of the plurality of display information, only the content part is displayed, and with respect to the display information other than it, only the index part is displayed, and therefore, it is possible to clearly distinguish the selected display information from the rest of the display information. Then, in a case that a content matching the search condition is displayed, the display manner of the content is changed, and in a case that a content matching the search condition is not displayed, the presence or absence of the content matching the search condition is shown depending on the change in the display manner of the index part, and therefore, it is easily determine whether or not a content matching the search condition is present for both of the display information displayed with the content and the display information not displayed with the content.

Example embodiments include a storage medium storing an information processing program according to certain embodiments, and the change in the display manner by the second display controlling step is a change in a color or a color tone.

Example embodiments include, by the second display controlling step, whether a content matching the search condition or not, or whether an index part corresponding to the content matching the search condition or not is shown according to a change in a color or a color tone. Accordingly, a change in a color or a color tone allows visually clear representation, capable of clearly showing whether or not a content matching the search condition is present.

Certain embodiments include a storage medium storing an information processing program according to other embodiments, and the plurality of display information are an electronic program guide by a plurality of dates, the content part includes a program guide for each date in which a plurality of program information are represented by a matrix manner by regarding one axis as a time axis and the other axis as a broadcast station axis, and the index part includes a date tub representing a date of the content part.

In certain example embodiments, a program guide of a selected date is displayed, and date tubs of the other dates are displayed. Then, in the displayed program guide, the display manner of the program information matching the search condition is changed, and the display manner of the date tub is changed depending on whether or not the program information matching the search condition is present. Accordingly, in the electronic program guide, it is possible to easily determine whether or not a program matching the search condition is present for both of the program guide on the selected date and the program guides on the other dates.

Certain example embodiments may include a storage medium storing an information processing program according to other embodiments, and causes a computer to execute a display switching determining step and a third display controlling step. The display switching determining step determines whether or not a display switching is instructed. The third display controlling step switches the display information between a two-dimensional display manner and a three-dimensional display manner and displays the switched display information when it is determined that the display switching is instructed.

In certain example embodiments, a display switching determining step (S9) determines whether or not a display switching is instructed on the basis of an operation by the user, for example. A third display controlling step (S11-S15) switches the display information between a two-dimensional display manner and a three-dimensional display manner and displays the switched display information when it is determined that the display switching is instructed. The two-dimensional display manner and the three-dimensional display manner are switched by switching a viewpoint location of a virtual camera and a gazing location (or viewing direction), for example. Accordingly, it is possible to switch the display manner of the display information between the two-dimensional display manner and the three-dimensional display manner at user's discretion. Specifically, by switching to the three-dimensional display, it is possible to highlight the change in the display manner of the index part.

Certain example embodiments include a storage medium storing an information processing program according example embodiments and causes a computer to further execute an instructed position detecting step, a camera location changing step, and a fourth display controlling step. The instructed position detecting step detects an instructed position by a user. The camera location changing step changes a camera location on the basis of the instructed position. The fourth display controlling step changes a display manner of the index part in correspondence to the camera location.

In certain example embodiments, in an instructed position detecting step (S19), an instructed position by the user is detected. For example, the information processing apparatus has an input device like a pointing device for instructing an arbitrary position on the screen displayed with the display information, and from input data by the input device, an instructed position by the user is detected. In a camera location changing step (S21-S29), a camera location is changed on the basis of the instructed position. The camera location means a parameter for indicating to which direction or point the virtual camera views, and includes coordinates of a location of the viewpoint, coordinates of a gazing location (or viewing direction), for example. The camera location is changed depending on whether or not the instructed position is within the predetermined area including the index part. In a fourth display controlling step (S103, S105), the display manner of the index part is further changed in correspondence to the camera location. For example, the direction of the index part is changed such that the index part is turned to the front on the screen, or the size of the index part is changed.

In certain example embodiments, it is possible to change the camera location and change the display manner of the index part according to an operation by the user. For example, in a case that it is determined that the user intends to select the index part on the basis of an instructed position, the camera location is changed such that the index part is noted to thereby further change the display manner of the index part. Accordingly, the index part corresponding to the content matching the search condition can be more clearly shown, and can be easily selected.

Certain example embodiments include an information processing apparatus having a plurality of display information including a content par which includes a plurality of contents and an index part which indicates indexes of the plurality of contents. The information processing apparatus comprises a first display controlling means, a search condition designating means, a content identifying means and a second display controlling means. The first display controlling means displays at least a content part of the display information arbitrarily selected out of the plurality of display information and displays an index part of other display information. The search condition designating means designates a search condition to search an arbitrary content from the plurality of contents. The content identifying means determines whether or not a content matching the search condition is present. The second display controlling means changes a display manner of the content which is included in the content part displayed by the first display controlling means and is determined to match the search condition by the content determining means and a display manner of the index part displayed by the first display controlling means in correspondence to a determination result by the content determining means.

In certain example embodiments an information processing apparatus to which the information processing program stored in the storage medium in the above-described embodiments is applied, and has an advantage similar to that of other example embodiments.

According to certain example embodiments, in the displayed content part, a display manner of the content matching the search condition is changed, and the display manner of the displayed index part is changed according to the search result, and therefore, it is possible to easily determine whether or not a content matching the search condition is present for both of the display information whose content is displayed and the display information whose content is not displayed.

The above described objects and other objects, features, aspects and advantages of certain example embodiments will become more apparent from the following detailed description when taken in conjunction with the accompanying drawings.

BRIEF DESCRIPTION OF THE DRAWINGS

FIG. 23 is an illustrative view showing one example of a possessed item list displayed in another embodiment, FIG. 23(A) shows a case that a "weapon" button is selected, and FIG. 23(B) shows a case that a "armor" button is selected; and FIG. 24 is an illustrative view showing one example of the possessed item list displayed with a search result, FIG. 24(A) shows a case that the "weapon" button is selected, and FIG. 24(B) shows a case that the "armor" button is selected.

DETAILED DESCRIPTION OF THE PREFERRED EMBODIMENTS

Figure 1:
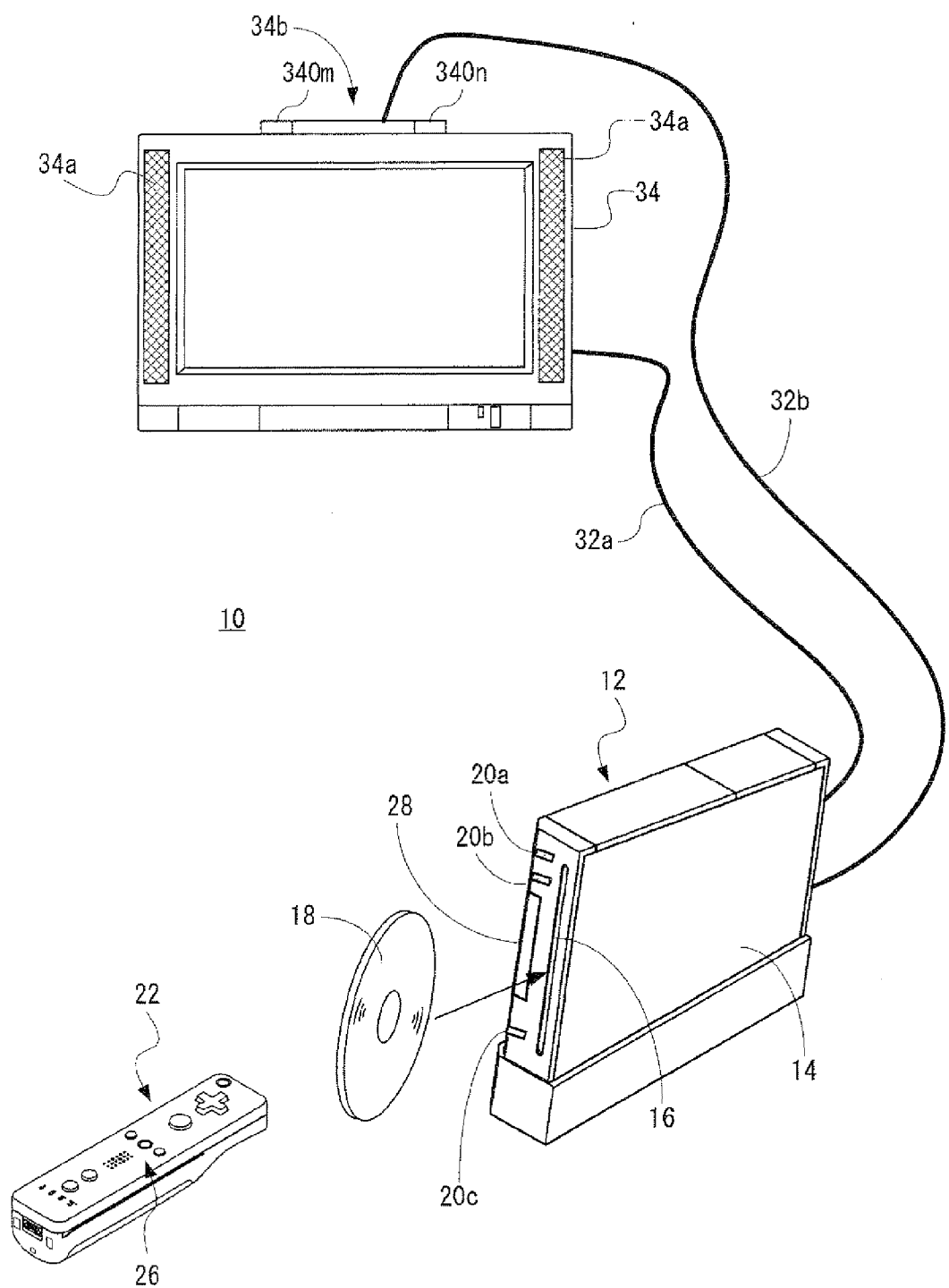
FIG. 1 is an illustrative view showing one example of a game system.

Referring to FIG. 1, a game system 10 of one embodiment includes a video game apparatus (hereinafter, simply referred to as "game apparatus") 12 and a controller 22. Although illustration is omitted, the game apparatus 12 of this embodiment is designed such that it can be connected to four controllers 22 at the maximum. Furthermore, the game apparatus 12 and the respective controllers 22 are connected by radio. The wireless communication is executed according to a Bluetooth (registered trademark) standard, for example, but may be executed by other standards such as infrared rays, a wireless LAN. Alternatively, they may be connected by a cable.

It should be noted that in this embodiment, a case that the information processing apparatus 10 is constructed by utilizing a console game apparatus 12 to be used at home shown in FIG. 1 is explained, but in another embodiment, other computers, such as a personal computer, a cellular phone, a mobile information terminal, etc. may be utilized.

The game apparatus 12 includes a roughly rectangular parallelepiped housing 14, and the housing 14 is furnished with a disk slot 16 on a front surface. An optical disk 18 as one example of an information storage medium storing a game program, etc. is inserted from the disk slot 16 to be loaded into a disk drive 54 (see FIG. 2) within the housing 14. Around the disk slot 16, an LED and a light guide plate are arranged so as to be light on or off in accordance with various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) provided inside the game apparatus 12 in place of the memory card. Also, the memory card may be utilized as a backup memory of the internal memory.

It should be noted that a general-purpose SD card can be employed as a memory card, but other general-purpose memory cards, such as memory sticks, multimedia cards (registered trademark) can be employed.

The game apparatus 12 has an AV cable connector 58 (see FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal thereof. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights so as to output infrared rays forward the monitor 34.

Furthermore, the power supply of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute the video game or other applications on the basis of the program recorded in the optical disk 18. The user operates the controller 22 in order to apply an input to the game apparatus 12. For example, by operating any one of the operating buttons of the input means 26, the game or other application is started. Besides the operation performed on the input means 26, by moving the controller 22 itself, it is possible to move a moving image object (player object) in different directions or change the perspective of the user (camera location) in a 3-dimensional game world.

Furthermore, the programs and data of the game or other applications may be stored in advance in an internal memory like the flash memory 44 (FIG. 2) of the game apparatus 12, or downloaded from a download server on a network so as to be additionally stored in the internal memory.

Figure 2:
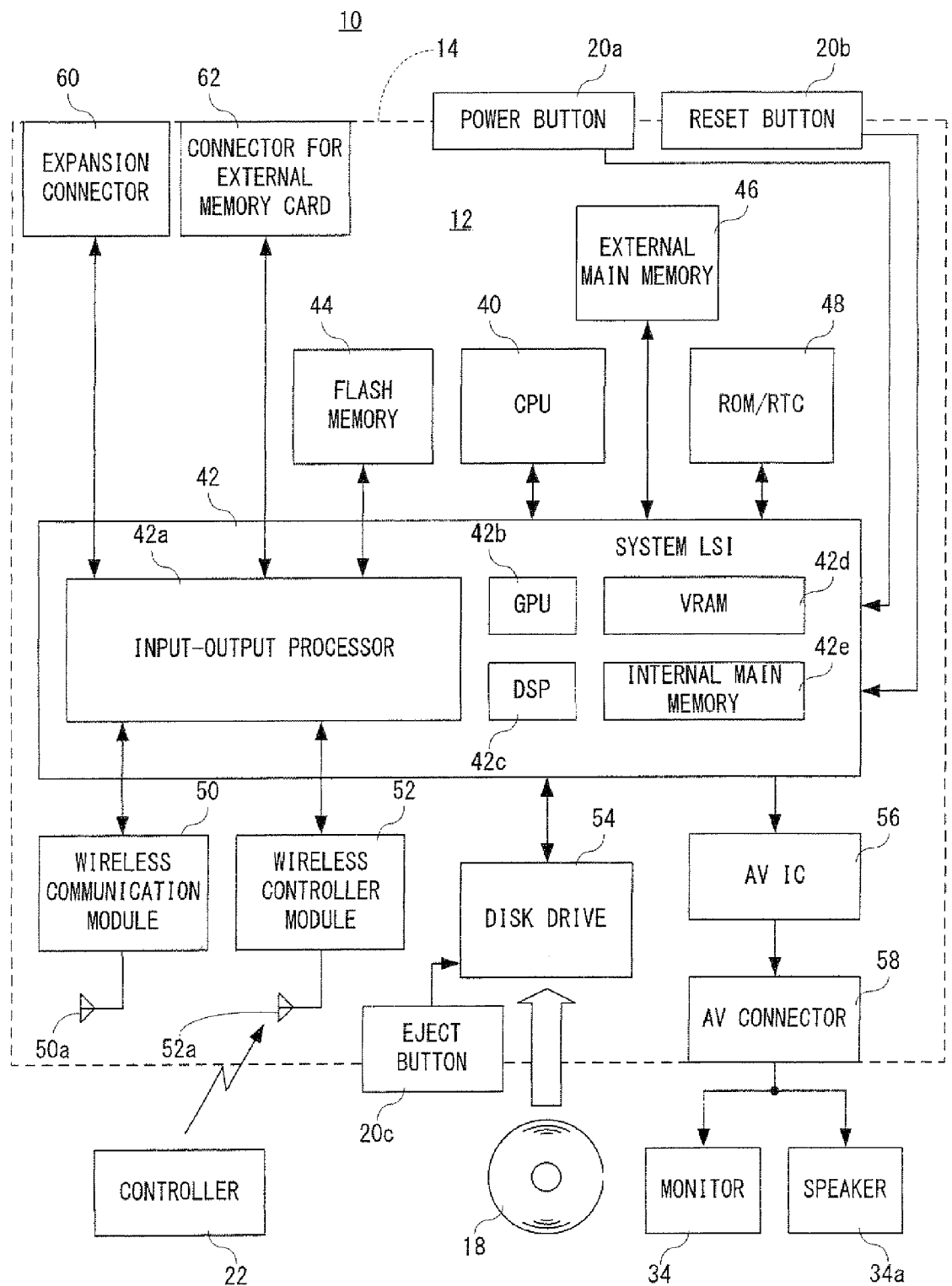
FIG. 2 is a block diagram showing an electric configuration of the game system shown in FIG. 1.

FIG. 2 is a block diagram showing an electric configuration of the video game system 10 shown in FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program data, texture data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted.

The input-output processor (I/O processor) 42a executes transmission and reception of data and executes download of the data.

The GPU 42b is made up of a part of a drawing means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction command. Here, the CPU 40 writes image data required for drawing to the VRAM 42d via the GPU 42b. The GPU 42b accesses the VRAM 42d to create game image data for drawing.

In this embodiment, a case that the GPU 42b generates game image data is explained, but in a case of executing an arbitrary application except for the game application, the GPU 42b generates image data as to the arbitrary application.

Furthermore, the DSP 42c functions as an audio processor, and generates audio data corresponding to a sound, a voice, music, or the like to be output from the speaker 34a by means of the sound data and the sound wave (tone) data stored in the internal main memory 42e and the external main memory 46.

The game image data and audio data which are generated as described above are read by the AV IC 56, and respectively output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

The input-output processor 42a can communicate with other game apparatuses and various servers to be connected to a network via a wireless communication module 50. It should be noted that it is possible to directly communicate with another game apparatus without going through the network. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. In a certain case, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives input data transmitted from the controller 22 via the antenna 52a and the wireless controller module 52, and (temporarily) stores it in the buffer area of the internal main memory 42e or the external main memory 46. The input data is erased from the buffer area after being utilized in game processing by the CPU 40.

In this embodiment, as described above, the wireless controller module 52 makes communications with the controller 22 in accordance with Bluetooth standards.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as other controllers. Furthermore, the expansion connector 60 is connected with a cable LAN adaptor, and can utilize the cable LAN in place of the wireless communication module 50. The connector for external memory card 62 can be connected with an external storage like a memory card. Thus, the input-output processor 42a, for example, accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 sets a mode of a normal energized state (referred to as "normal mode") in which the respective components of the game apparatus 12 are supplied with power through an AC adapter not shown. On the other hand, when the power button 20a is turned off, the system LSI 42 sets a mode in which a part of the components of the game apparatus 12 is supplied with power, and the power consumption is reduced to minimum (hereinafter referred to as "standby mode"). In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, the standby mode is a mode in which the CPU 40 never executes an application.

Although the system LSI 42 is supplied with power even in the standby mode, supply of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20a is turned off, by making the standby mode unusable, the power supply to all the circuit components are completely stopped.

Furthermore, switching between the normal mode and the standby mode can be performed by turning on and off the power switch 26h of the controller 22 by remote control. If the remote control is not performed, setting is made such that the power supply to the wireless controller module 52a is not performed in the standby mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Figure 3:
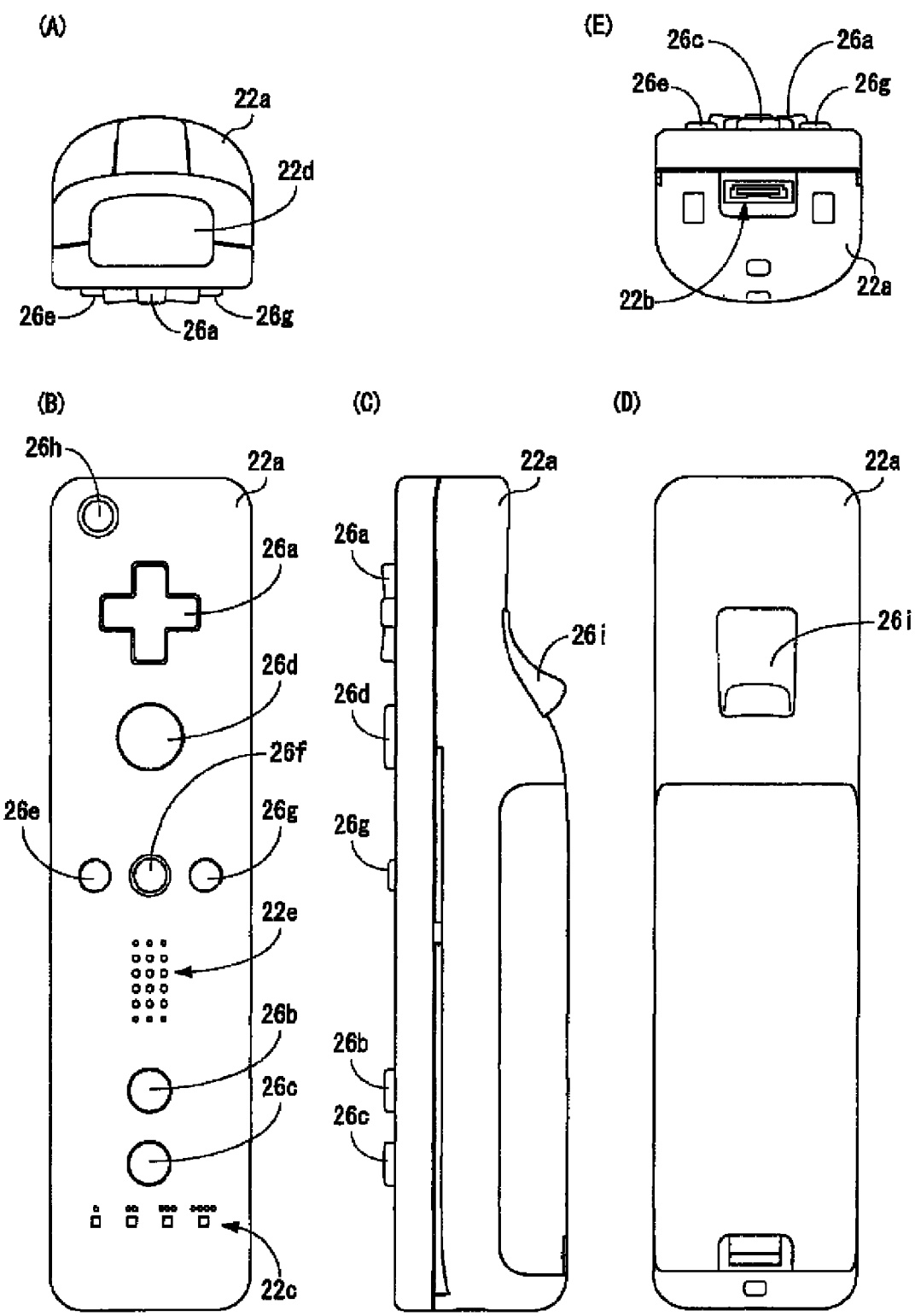
FIG. 3 is an illustrative view showing an external view of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a lower surface of the controller 22, and FIG. 3 (E) shows a back end surface of the controller 22.

Referring to FIG. 3 (A) and FIG. 3 (E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3 (B), on an upper face of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3 (C) and FIG. 3 (D), an inclined surface is formed on a lower surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or object (player character or player object) that is operable by a player or instruct a moving direction of a cursor.

The 1 button 26b and the 2 button 26c are respectively push button switches, and are used for a game operation, such as adjustment of a viewpoint position and a viewpoint direction on displaying the 3D game image, i.e. a position and an image angle of a virtual camera, and the like. Alternatively, the 1 button 26b and the 2 button 26c can be used for the same operations as those of the A-button 26d and the B-trigger switch 26i or an auxiliary operation therefor.

The A-button switch 26d is a push button switch, and is used for causing the player character or the player object to take an action other a directional instruction, that is, an arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine a weapon and a command, and so forth.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (restarting) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also a push button switch, and is mainly used for inputting like a trigger such as shooting and designating a position selected by the controller 22. In a case that the B-trigger switch 26i is continued to be pushed, it is possible to make movements and parameters of the player object constant. In a fixed case, the B-trigger switch 26i functions in the same way as the B-button normally does, and is used for canceling the action determined by the A-button 26d.

As shown in FIG. 3 (E), an external expansion connector 22b is provided on a back end surface of the housing 22a, and as shown in FIG. 3 (B), an indicator 22c is provided on the top surface and at the rear of the housing 22a. The external expansion connector 22b is utilized for connecting another expansion controller not shown. The indicator 22c is made up of four LEDs, for example, and shows identification information (controller number) of the controller 22 corresponding to the lighting LED by lighting any one of the four LEDs, and shows the remaining amount of power of the controller 22 depending on the number of LEDs to be emitted.

In addition, the controller 22 has an imaged information arithmetic section 80 (see FIG. 4), and is provided with a light incident opening 22d of the imaged information arithmetic section 80 on the front end surface of the housing 22a as shown in FIG. 3 (A). Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3 (B).

Note that, the shape of the controller 22 and the shape, number and setting position of each input means 26 shown in FIG. 3 (A) to FIG. 3 (E) are simply examples, and needless to say, even if they are suitably modified, other example embodiments may be realized.

Figure 4:
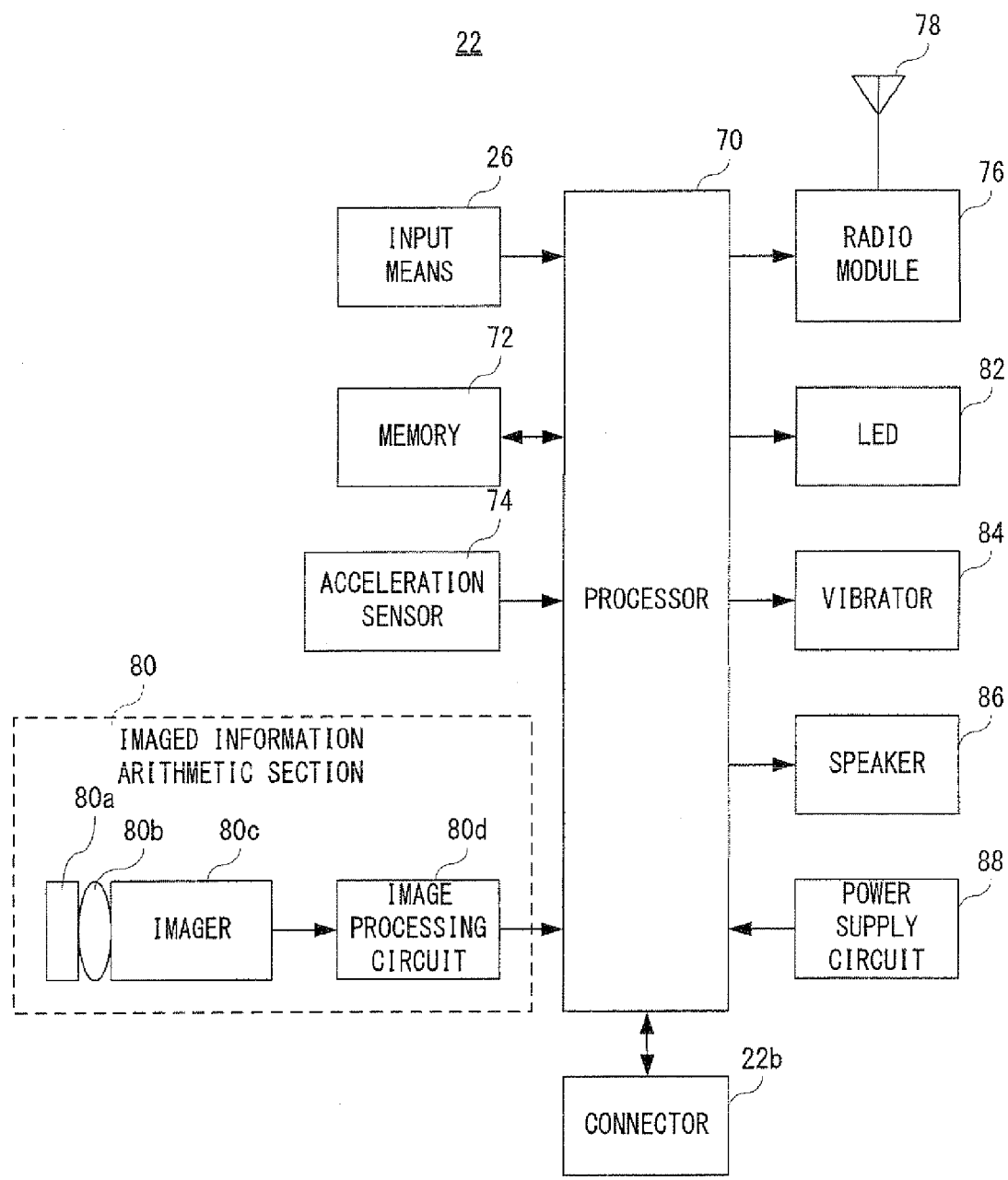
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), an vibrator 84, the speaker 86, and a power supply circuit 88 by an internal bus (not shown). Moreover, an antenna 78 is connected to the radio module 76.

The processor 70 is in charge of an overall control of the controller 22, and transmits (inputs) information (input information) input by the input means 26, the acceleration sensor 74, and the imaged information arithmetic section 80 as input data, to the game apparatus 12 via the radio module 76 and the antenna 78. At this time, the processor 70 uses the memory 72 as a working area or a buffer area.

An operation signal (operation data) from the aforementioned input means 26 (26a to 26i) is input to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and stores it in the memory 72 once. The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3 (A) to FIG. 3 (E), the acceleration sensor 74 is provided on the circuit board at a position corresponding to the place where the cross key 26*a* is arranged inside the housing 22*a*.

It will be appreciated by those skilled in the art from the description of this specification that a computer, such as a processor (CPU 40, for example) of the game apparatus 12 or the processor (processor 70, for example) of the controller 22 executes processing on the basis of acceleration data output from the acceleration sensors 74 to thereby estimate or calculate (determine) more information relating to the controller 22.

In a case that processing is executed on the side of the computer assuming that the controller 22 incorporated with the single axis acceleration sensor 74 is in a static state, that is, processing is executed considering that accelerations detected by the acceleration sensor 74 is only gravitational accelerations, if the controller 22 is actually in a static state, it is possible to know whether or not the orientations of the controller 22 is inclined with respect to the direction of gravity or to what extent they are inclined on the basis of the detected acceleration. More specifically, when a state in which the detection axis of the acceleration sensor 74 is turned to a vertically downward direction is taken as a reference, merely whether or not 1G (gravitational acceleration) is imposed on can show whether or not the controller 22 is inclined, and the size can show to what extent it is inclined.

Furthermore, if a multi-axes acceleration sensor 74 is applied, by further performing processing on acceleration data of each axis, it is possible to more precisely know to what extent the controller 22 is inclined with respect to the direction of gravity. In this case, on the basis of outputs from the acceleration sensor 74, the processor 70 may perform processing of calculating data of inclined angle of the controller 22, but perform processing of estimating an approximate inclination on the basis of the outputs from the acceleration sensor 74 without performing the processing of calculating the data of the inclined angle. Thus, by using the acceleration sensor 74 in conjunction with the processor 70, it is possible to determine an inclination, an orientation or a position of the controller 22.

On the other hand, assuming that the acceleration sensor 74 is in a dynamic state, accelerations according to the movement of the acceleration sensor 74 is detected in addition to the gravitational acceleration component, and therefore, if the gravitational acceleration component is removed by predetermined processing, it is possible to know a moving direction, etc. More specifically, in a case that the controller 22 being furnished with the acceleration sensor 74 is accelerated and moved by the hand of the user, acceleration data generated by the acceleration sensor 74 is processed, to thereby calculate various movements and/or positions of the controller 22.

Additionally, even when assuming that the acceleration sensor 74 is in a dynamic state, if an acceleration in correspondence to the movement of the acceleration sensor 74 is removed by the predetermined processing, it is possible to know the inclination with respect to the direction of gravity. In another embodiment, the acceleration sensor 74 may contain a built-in signal processing apparatus or other kinds of dedicated processing apparatuses for performing desired processing on the acceleration signal (acceleration data) output from the incorporated acceleration detecting means before outputting the acceleration data to the processor 70. For example, in a case that the acceleration sensor 74 is one for detecting a static acceleration (gravitational acceleration, for example), the built-in or dedicated processing apparatuses may be one for transforming the detected acceleration data into the inclined angle (or other preferable parameters) corresponding thereto.

The radio module 76 modulates a carrier of a predetermined frequency by the input data by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal thus transmitted is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the obtained input data and a program (game program or application program).

In addition, as described above, the controller 22 is provided with the imaged information arithmetic section 80. The imaged information arithmetic section 80 is made up of an infrared rays filter 80*a*, a lens 80*b*, an imager 80*c*, and an image processing circuit 80*d*. The infrared rays filter 80*a* passes only infrared rays from the light incident from the front of the controller 22. As described above, the markers 340*m* and 340*n* placed near (around) the display screen of the monitor 34 are infrared LEDs for outputting infrared lights forward the monitor 34. Accordingly, by providing the infrared rays filter 80*a*, it is possible to image the image of the markers 340*m* and 340*n* more accurately. The lens 80*b* condenses the infrared rays passing thorough the infrared rays filter 80*a* to emit them to the imager 80*c*. The imager 80*c* is a solid imager, such as a CMOS sensor and a CCD, for example, and images the infrared rays condensed by the lens 80*b*. Accordingly, the imager 80*c* images only the infrared rays passing through the infrared rays filter 80*a* to generate image data. Hereafter, the image imaged by the imager 80*c* is called an "imaged image". The image data generated by the imager 80*c* is processed by the image processing circuit 80*d*. The image processing circuit 80*d* calculates a position of an object to be imaged (markers 340*m* and 340*n*) within the imaged image, and outputs each coordinate value indicative of the position to the processor 70 as imaged data for each fourth predetermined time. It should be noted that a description of the process in the image processing circuit 80*d* is made later.

Figure 5:
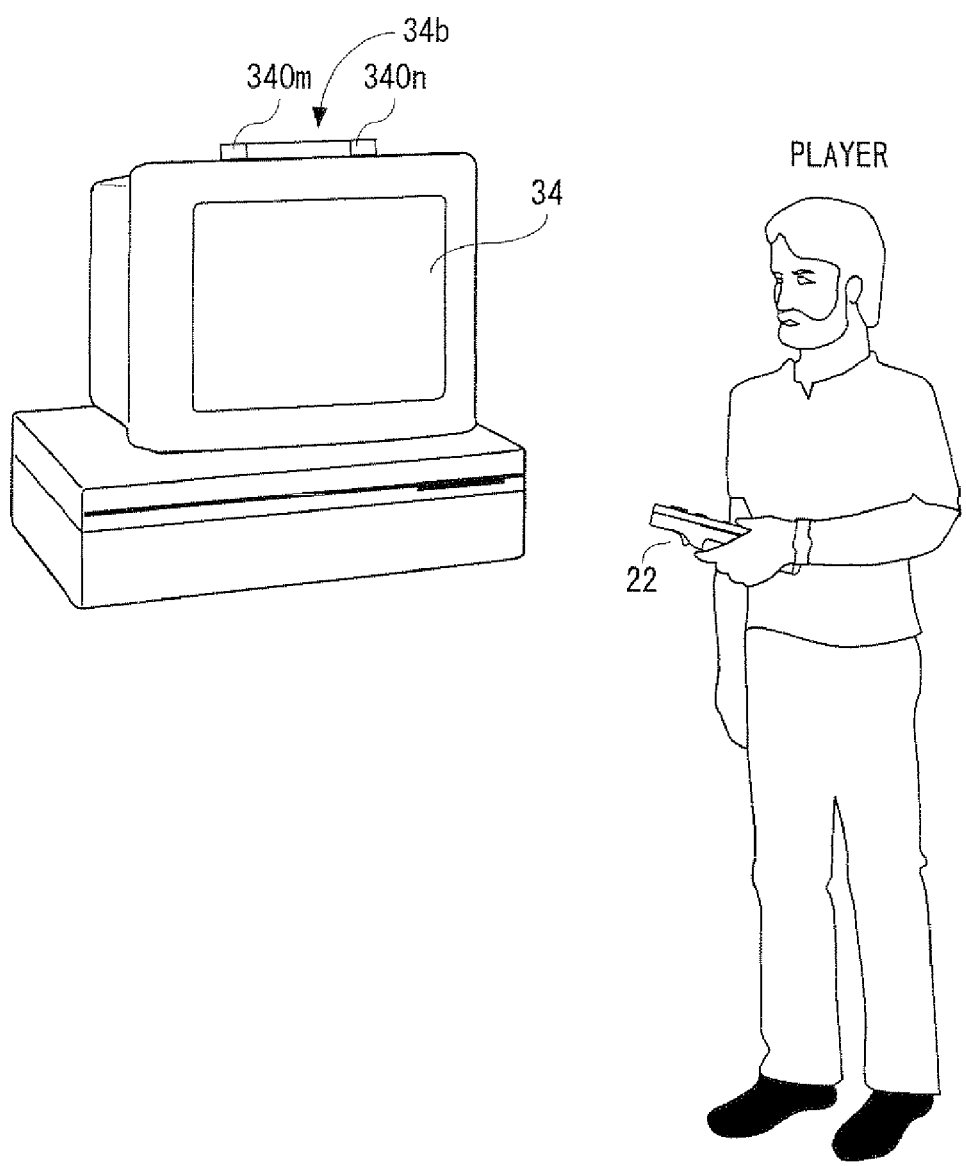
FIG. 5 is an illustrative view roughly explaining a condition when a game is played by utilizing the controller shown in FIG. 1.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the incident light opening 22*d* of the light imaged by the imaged information arithmetic section 80) of the controller 22 is oriented to the markers 340*m* and 340*n*. It should be noted that as can be understood from FIG. 1, the markers 340*m* and 340*n* are placed in parallel with the horizontal direction of the screen of the monitor 34. In this state, the player performs a game operation by changing a position on the screen indicated by the controller 22, and changing a distance between the controller 22 and each of the markers 340*m* and 340*n*.

Figure 6:
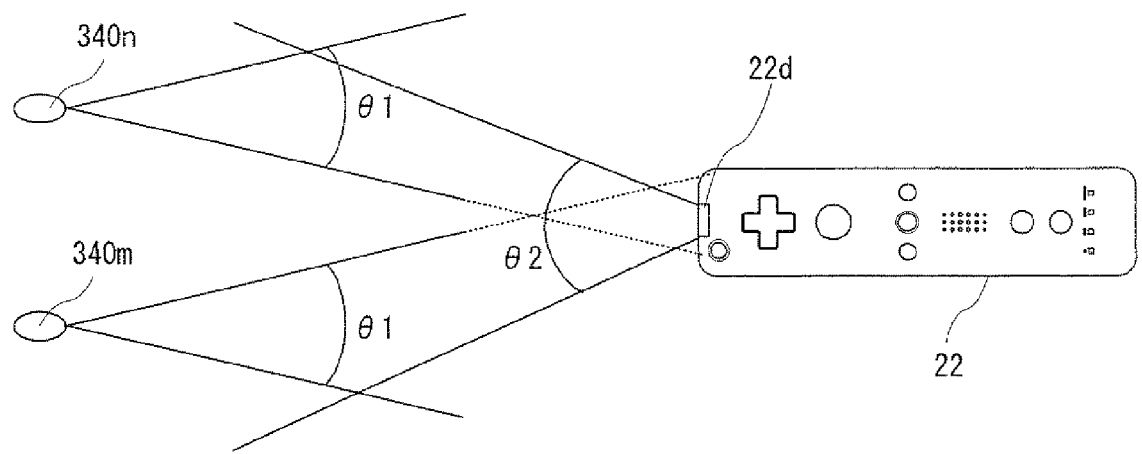
FIG. 6 is an illustrative view explaining view angels of the markers and the controller shown in FIG. 1.

FIG. 6 is a view showing viewing angles between the respective markers 340*m* and 340*n*, and the controller 22. As shown in FIG. 6, each of the markers 340*m* and 340*n* emits infrared ray within a range of a viewing angle θ1. Also, the imager 80*c* of the imaged information arithmetic section 80 can receive incident light within the range of the viewing angle θ2 taking the line of sight of the controller 22 as a center. For example, the viewing angle θ1 of each of the markers 340*m* and 340*n* is 34° (half-value angle) while the viewing angle θ2 of the imager 80*c* is 41°. The player holds the controller 22 such that the imager 80*c* is turned and positioned so as to receive the infrared rays from the two markers 340*m* and 340*n*. More specifically, the player holds the controller 22 such that at least one of the markers 340*m* and 340*n* exists in the viewing angle θ2 of the imager 80*c*, and the controller 22 exists in at least one of the viewing angles θ1 of the marker 340*m* or 340*n*. In this state, the controller 22 can detect at least one of the markers 340*m* and 340*n*. The player can perform a game operation by changing the position and the orientation of the controller 22 in the range satisfying the state.

If the position and the orientation of the controller 22 are out of the range, the game operation based on the position and the orientation of the controller 22 cannot be performed. Hereafter, the above-described range is called an "operable range."

Figure 7:
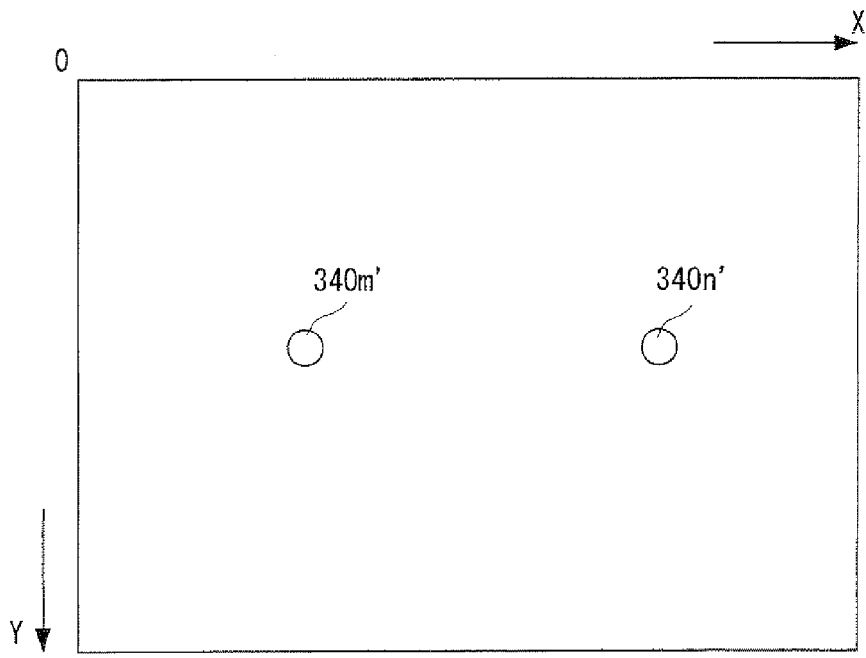
FIG. 7 is an illustrative view showing one example of an imaged image including object images.

If the controller 22 is held within the operable range, an image of each of the markers 340*m* and 340*n* is imaged by the imaged information arithmetic section 80. That is, the imaged image obtained by the imager 80*c* includes an image (object image) of each of the markers 340*m* and 340*n* as an object to be imaged. FIG. 7 is a view showing one example of the imaged image including the object images. The image processing circuit 80*d* calculates coordinates (marker coordinates) indicative of the position of each of the markers 340*m* and 340*n* in the imaged image by utilizing the image data of the imaged image including the object images.

Since the object image appears as a high-intensity part in the image data of the imaged image, the image processing circuit 80*d* first detects the high-intensity part as a candidate of the object image. Next, the image processing circuit 80*d* determines whether or not the high-intensity part is an object image on the basis of the size of the detected high-intensity part. The imaged image may include images other than the object image due to sunlight through a window and light of a fluorescent lamp in the room as well as the images 340*m*' and 340*n*' of the two markers 340*m* and 340*n* as an object image. The determination processing whether or not the high-intensity part is an object image is executed for discriminating the images 340*m*' and 340*n*' of the two markers 340*m* and 340*n* as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinates of the barycenter position are called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination process, and therefore, two marker coordinates are calculated. The image processing circuit 80*d* outputs data indicative of the calculated two marker coordinates. The data (marker coordinate data) of the output marker coordinates is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and distances from the controller 22 to the respective markers 340*m* and 340*n* on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates.

This game system 10 has a plurality of display information, each of the plurality of display information has a content part including a plurality of contents and an index part including the plurality of contents. On the monitor 34, at least the content part of the display information arbitrarily selected and the index part of the other display information are displayed. Furthermore, the game system 10 is provided with a content search function for determining whether or not a content matching the search condition designated by the user is present. Then, with respect to the display information of the content part in which a content matching the search condition is displayed, a display manner of the content is changed. In addition, a display manner of the index part is changed depending on whether or not a content matching the search condition is present.

More specifically, in this embodiment an electronic program guide displaying application is explained. That is, the display information is an electronic program guide, and the content is program information. In the electronic program guide displaying application, a program guide including a plurality of program information is displayed on the monitor 34 as a content part. The user can confirm a broadcast station, an airdate, a current time, etc. of desired program information on the monitor 34, displays the detailed information as necessary.

However, since the electronic program guide data includes a number of program information, such as a plurality of broadcast stations and program information of a plurality of dates, etc., it is difficult to display all the program information on the monitor 34 at a time. Thus, in this game system 10, only a part of the program information is displayed. For example, a plurality of program information is classified into each of dates, and the program information of the date arbitrarily selected as a program guide. Then, the program information of the other dates are not displayed on the program guide, and only the index part indicating those dates is displayed.

This electronic program guide displaying application allows a search for the program information, and enables the user to confirm the program information matching the designated search condition on the electronic program guide. Then, with respect to the program information included in the program guide that the program information matching the search condition is displayed, a display manner of such the program information is changed. In addition, in this embodiment, with respect to the program information corresponding to the date of the index part that the program information matching the search condition is being displayed, a display manner of the index part of that date is changed. Thus, it is possible to easily determine whether or not there is program information matching the search condition with respect to both of the program guide displayed with the program information and the program guide not displayed with the program information.

Figure 8:
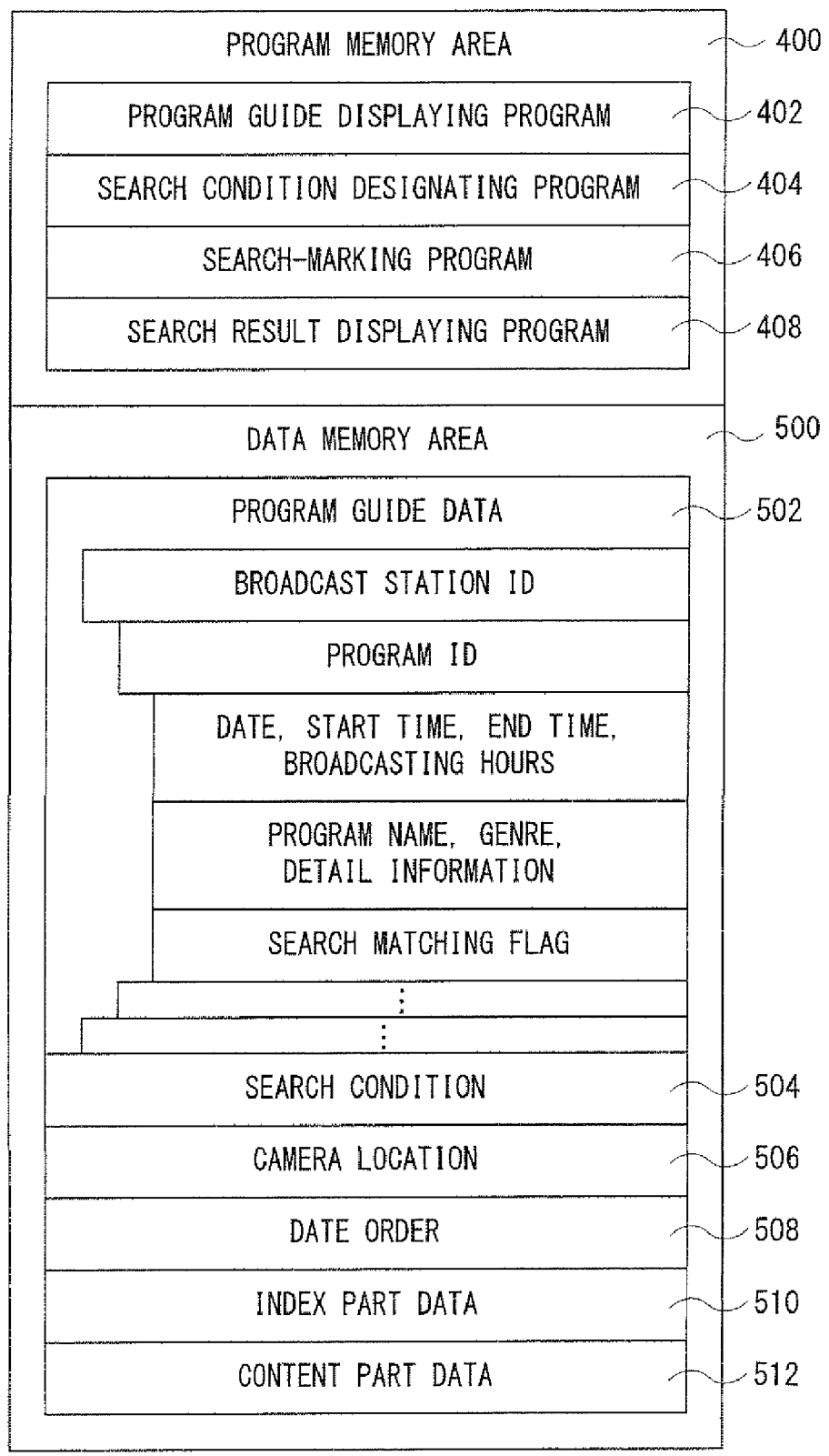
FIG. 8 is an illustrative view showing one example of a memory map of the game apparatus shown in FIG. 1.

FIG. 8 shows one example of a memory map of the game apparatus 12. The memory map includes a program memory area 400 and a data memory area 500. The information processing program and data are read from the optical disk 18 entirely at a time, or partially and sequentially as necessary so as to be stored into the external memory 46 or the internal memory 42*e*. Furthermore, in the data memory area 500, data generated or fetched by the processing is also stored.

Additionally, FIG. 8 shows only a part of the memory map, and other programs and data necessary for processing are also stored. For example, sound data for outputting a sound, such as a voice, a sound effect, music, etc., image data for generating a screen, a sound outputting program, an image generating and displaying program, etc. are read from the optical disk 18, and stored in the data memory area 500 or the program memory area 400. It should be noted that in this embodiment, a program and data are read from the optical disk 18, but in another embodiment, a program and data stored in advance in a nonvolatile storage medium such as the flash memory 44, etc. incorporated in the game apparatus 12, or downloaded via the network 104 may be read so as to be stored in the external memory 46 or the internal memory 42*e*.

Figure 9:
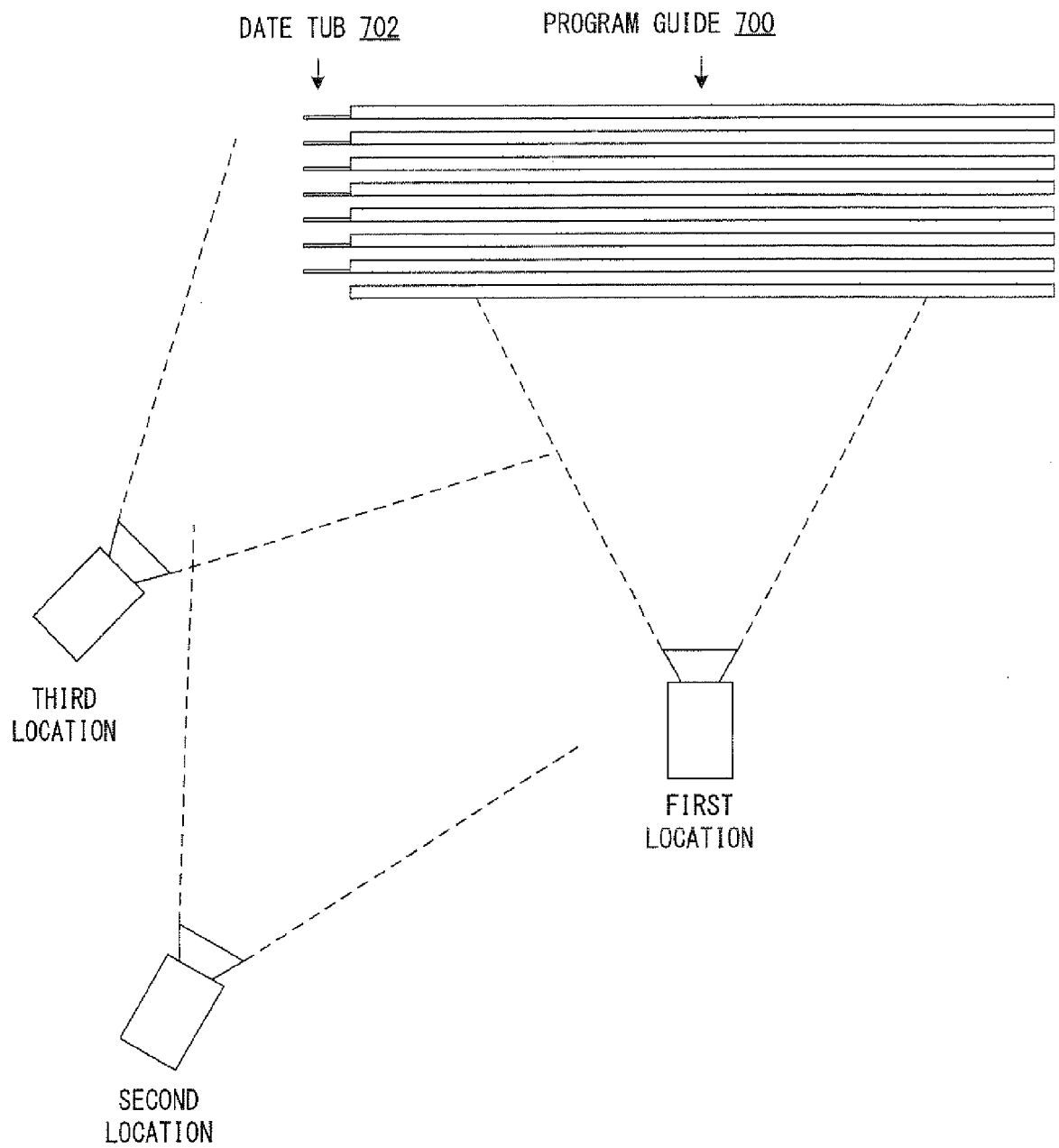
FIG. 9 is an illustrative view explaining positional relationships between a program guide and camera locations.

In a memory area 402 of the program memory area 400, a program guide displaying program is stored. This displaying program is for generating a screen including an electronic program guide on the basis of program guide data, index part data and content part data, etc. to be described later and displaying the same on the monitor 34. In this embodiment, the switching display of the program guide between a three-dimensional display manner (see FIG. 10) and a two-dimensional display manner (see FIG. 15) is made possible. As shown in FIG. 9, a plurality of camera locations for displaying the program guide at a plurality of viewpoints are set in advance, and according to the switching of the camera locations, the display of the program guide is switched between the three-dimensional display manner and the two-dimensional display manner. Here, the camera location means a parameter to represent which place the virtual camera views, and in this embodiment, includes coordinates of the viewpoint and coordinates of the gazing point (or viewing direction).

More specifically, FIG. 9 shows a situation that the program guide (inclusively denoted by reference numeral "700") placed in the virtual 3-dimensional space is viewed from above. In this embodiment, as described above, a plurality of program information is classified into each of dates, the program guide for each date is displayed as a content part, and therefore, the program guide for one day is represented by a sheet of plate (rectangular parallelepiped). Furthermore, the program guide 700 of predetermined dates (eight days, in this embodiment) is displayed, so that a plurality of sheets of plates (eight sheets in this embodiment) are arranged in parallel with each other at predetermined intervals. The plate at the forefront is the program guide displayed with the program information when viewed from the camera location (first location, second location and third location). On the plate at the forefront, the program guide on the date arbitrarily selected is displayed. For example, a program guide corresponding to predetermined data, such as a current date and time, etc. may be selected, a program guide of the date decided in advance (program guide data on the oldest date, for example) may be selected, a program guide selected on the date selected or set by the user may be selected, and so forth.

Figure 15:
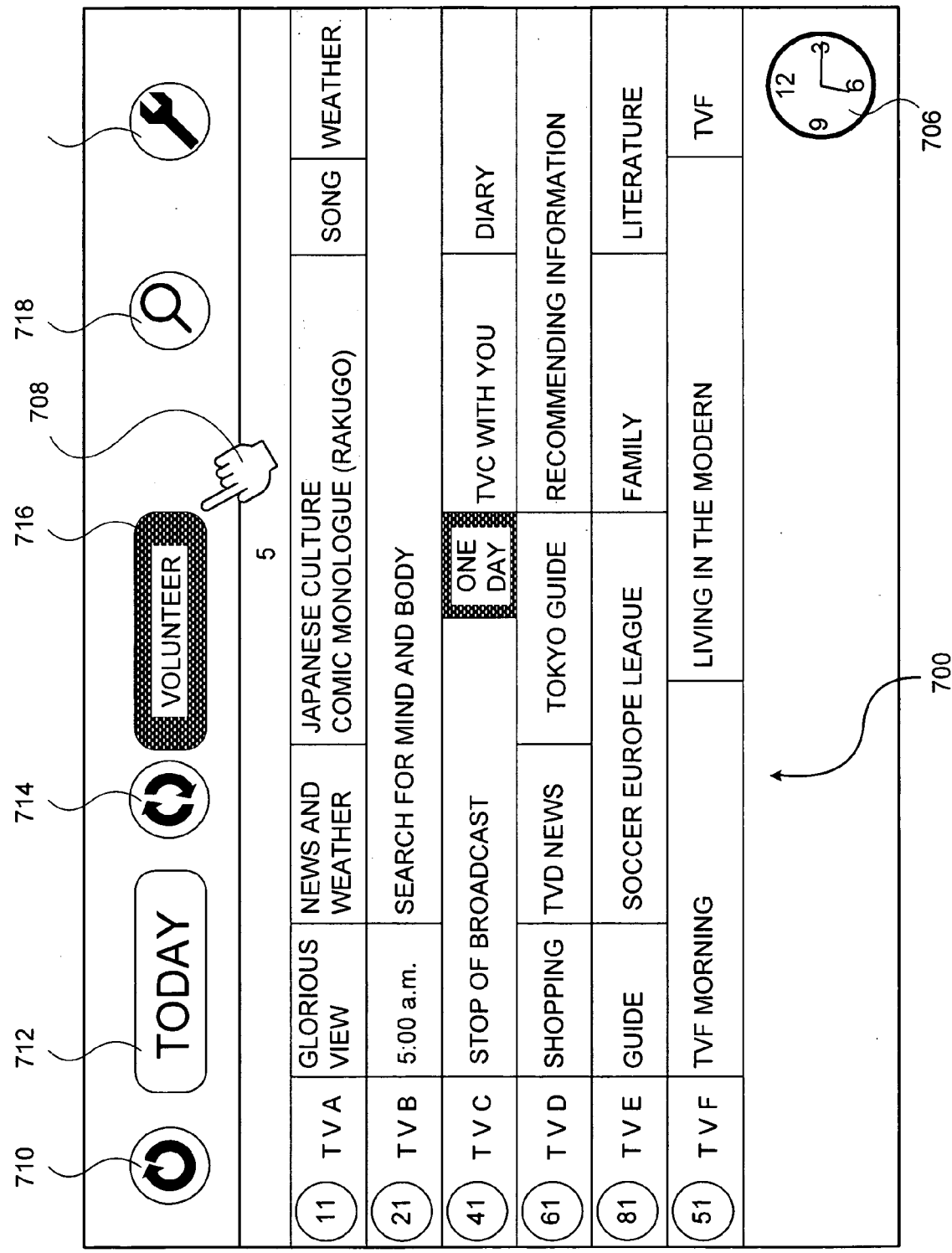
FIG. 15 is an illustrative view showing one example of the program guide displayed with a search result in a two-dimensional display manner.

The program guide in this embodiment is constructed so as to take one axis as a time axis and the other axis as a broadcast station axis, and a plurality of program information are displayed in a matrix manner. For example, as shown in FIG. 15, the vertical axis is set to the broadcast station axis, and the horizontal axis is set to the time axis. A plurality of fields for describing program information of each of the plurality of broadcast stations are arranged in the longitudinal direction. The field of each broadcast station is further sectioned into fields for respective program information. The width of the field of each program information is decided in correspondence to the length of the broadcasting hours of the program. Accordingly, the vertical length of the plate of the program guide 700 is decided depending on the number of broadcast stations to be displayed along the vertical axis, and the horizontal length thereof is decided to be a predetermined length corresponding to 24 (twenty-four) hours in advance. Here, in this embodiment, the program guide at the forefront is formed by generating rectangular parallelepipeds of respective program information, and combining these rectangular parallelepipeds.

Furthermore, the other plates of the program guide 700 are not displayed with program information, and provided with date tubs (inclusively denoted by reference numeral "702") as an index part on one side of the plates at a predetermined position (left side of the plate in this embodiment). That is, with respect to the program information of the other dates, only the date tubs 702 are displayed.

The first location is a camera location for displaying the program guide 700 in the two-dimensional display manner, and the second location and the third location are camera locations for displaying the program guide 700 in the three-dimensional display manner. As for each of the camera locations, the coordinates of the viewpoint location and the coordinates of the gazing location (or viewing direction) are decided and stored in advance.

The two-dimensional display manner is for representing an object or image by a two-dimensional manner. Accordingly, the first location is appropriately set such that the plate at the forefront out of the plates of the program guide 700 can be displayed as a two-dimensional plane on the screen, that is, as a two-dimensional table. Here, the direction connecting the viewpoint of the first location and the gazing point, that is, the viewing direction is set to a direction orthogonal to the front of the plate. Furthermore, the two-dimensional display manner is mainly provided in order to clearly show letters indicating the program information to the user, and therefore, the distance between the viewpoint of the first location and the plate at the forefront is set so as to become relatively short.

However, since it is difficult to display all the program information of one day at a time such that the characters indicating the program information are clearly shown, in a default manner, the viewpoint and the gazing point are set to predetermined positions such that the display range includes a time slot corresponding to a predetermined time or the current time. Then, the viewpoint and the gazing point are changed such that the display range is moved according to a scrolling operation, etc. by the user.

On the other hand, the three-dimensional display manner is for representing an object in a three-dimensional manner. The second location is appropriately set such that the program guide 700 is caught as a whole and displayed in the three-dimensional manner. In this embodiment, the date tubs 702 are provided at the left side of the plate, so that the viewpoint and the gazing point (or viewing direction) are decided in advance as a second location such that the program guide 700 can be caught from a relatively far place in a obliquely left direction. By setting a manner that the program guide is caught from the oblique direction, it is possible to generate a three-dimensional image in which the plate of the program guide 700 is represented in a three-dimensional manner.

Furthermore, the third location is appropriately set so as to zoom in the date tubs 702 to thereby note the date tubs 702. In this embodiment, the viewpoint and the gazing point (or viewing direction) are decided in advance as a third location such that the program guide 700 can be caught from a relatively near place in a obliquely left direction.

A memory area 404 stores a search condition designating program. This designating program is for designating a search condition of the program information in response to an operation by the user. In this embodiment, a genre search and a keyword search are made possible, in which the user can designate a genre or a key word (character string) as a search condition. More specifically, in the genre search, by selecting a desired genre from a plurality of genres set in advance, the program information matching the genre can be searched. In the keyword search, by inputting a desired character, selecting a letter displayed on the program guide and the detailed screen, a character string as a key word can be designated, so that the program information including a character string matching the character string can be searched. Furthermore, if a history of character strings utilized in the past keyword searches performed by a predetermined number of times in the past is stored in the flash memory 44, and the character strings of the history are displayed, a desired character string can be selected according to an operation by the user from the history of the character strings performed in the past searches.

A memory area 406 stores a search-marking program. The search-matching program is a program for determining whether or not program information matching the search condition is present, and is specifically for determining whether or not the search condition is coincident with each program information, and marking the program information which is determined to match the search condition. For example, in the genre search, the genre of the program guide data described later is made a searching object, and in the keyword search, a program name, a genre and detailed information of the program guide data are made as searching objects. Furthermore, marking here means processing of marking the program information matching a search condition, and is specifically processing of turning on a search matching flag of the program information matching the search condition in this embodiment.

A memory area 408 stores a search result displaying program. This displaying program is for displaying a search result on the program guide. More specifically, in a case that program information matching the search condition is included in the program guide, a display manner of the program information is changed. On the other hand, if program information matching the search condition is included in the program guide corresponding to the date tub 702, a display manner of the date tub 702 is changed. In this embodiment, as a change in the display manner of the program information or the date tub 702, a color or a color tone is changed. For example, a normal color (white, or the like) is changed to a different color (red, or the like), a color tone of the normal color may be different to another color tone. Or, with respect to each of red (R), green (G), blue (B), changing the color tone of each color may bring about another different color. Thus, it is possible to visually clearly represent the change in the display manner.

A memory area 502 of a data memory area 500 stores program guide data. The program guide data is generated on the basis of EPG (Electronic Program Guide) data fetched from a distribution server, or the like on a network. Additionally, the EPG data includes program information of a predetermined dates, and is fetched at a predetermined timing (starting up the application, for example) or periodically (for each 24 hours, for example) from the distribution server, etc. so as to be stored in the flash memory 44. As shown in FIG. 8, the program guide data stores program information for each broadcast station, that is, stores a plurality of program information by being brought into correspondence to the broadcast station ID (identification information of the broadcast station). In addition, information in relation to the program is stored for each program information, that is, a date, a start time, an end time, broadcasting hours, a program name, a genre, detailed information, etc. are stored by being brought into correspondence to the program ID (identification information of a program). The detailed information includes information on an outline and a performer of the program, etc. Here, a main object of the program guide is to confirm program information to be broadcasted, and therefore, the data on the date which has already been passed may be deleted or may not be used.

Furthermore, this program guide data memory area 502 stores a search matching flag of each program information stored by being brought into correspondence to a program ID. In the program search-marking processing, the program guide data memory area 502 is searched, and if program information matching a search condition is present, the search matching flag corresponding to the program ID is turned on.

A memory area 504 stores a search condition designated by the search condition designating program. In the genre search, a genre selected from a plurality of genres according to an operation by the user is stored. In the keyword search, a character string input according to an operation by the user with a software keyboard, a character string selected according an operation by the user from the program names and the detailed information displayed on the program guide detailed screen, a character string selected from a history, etc. are stored.

A memory area 506 stores a camera location. As a camera location, any one of the first location for a two-dimensional display manner, and the second location and the third location for a three-dimensional display manner as shown in FIG. 9 described above is stored. Here, if the first location is selected, a viewpoint location, a gazing location, etc. are changed according to the current time and a scrolling operation, etc.

A memory area 508 stores information in relation to a date order. More specifically, data for indicating a plurality of dates included in the program guide data and an order of these dates are stored. For example, numbers starting "1" are applied in sequence of date from the oldest date (that is, today) out of the plurality of dates. The program information corresponding to the date with the number "1" is displayed on the forefront plate as a program guide, and the date tub 702 indicating the date successive to the number "1" is displayed on each of the successive plate. If the date of the program guide to be displayed at the forefront is changed by a selection of the date tub 702, or an operation of changing the date, etc., the date-sequential data is updated, and the number is consecutively applied from the selected date.

A memory area 510 stores index part data. In this embodiment, a date is adopted as an index of the program information, and therefore, the index part data is data for controlling a display of the date tub 702. The index part data includes information in relation to a position, a display manner (direction, size, color, etc.), date and day of the week to be displayed, etc. of each date tub 702.

A memory area 512 stores content part data. In this embodiment, a program guide on each date is adopted as a content part, and therefore, the content part data is data for controlling the display of the program guide for each date. The content part data includes information in relation to a position, a display manner (size, color, etc.), etc. of a rectangular parallelepiped of each program information making up of the plate of the program guide at the forefront, and information in relation to positions, sizes, etc. of the other plates. The data of each rectangular parallelepiped is stored by being brought into correspondence to the program ID. In a case of the two-dimensional display manner, a program name, etc. displayed on each rectangular parallelepiped, that is, each program information field is fetched from the program guide data.

This program guide displaying application is activated by selecting a button or icon, or the like indicating this application on the menu screen of the game apparatus 12, for example. When the application is started up, the program guide (and time slot) with the date corresponding to the current date and time is displayed, for example.

Figure 10:
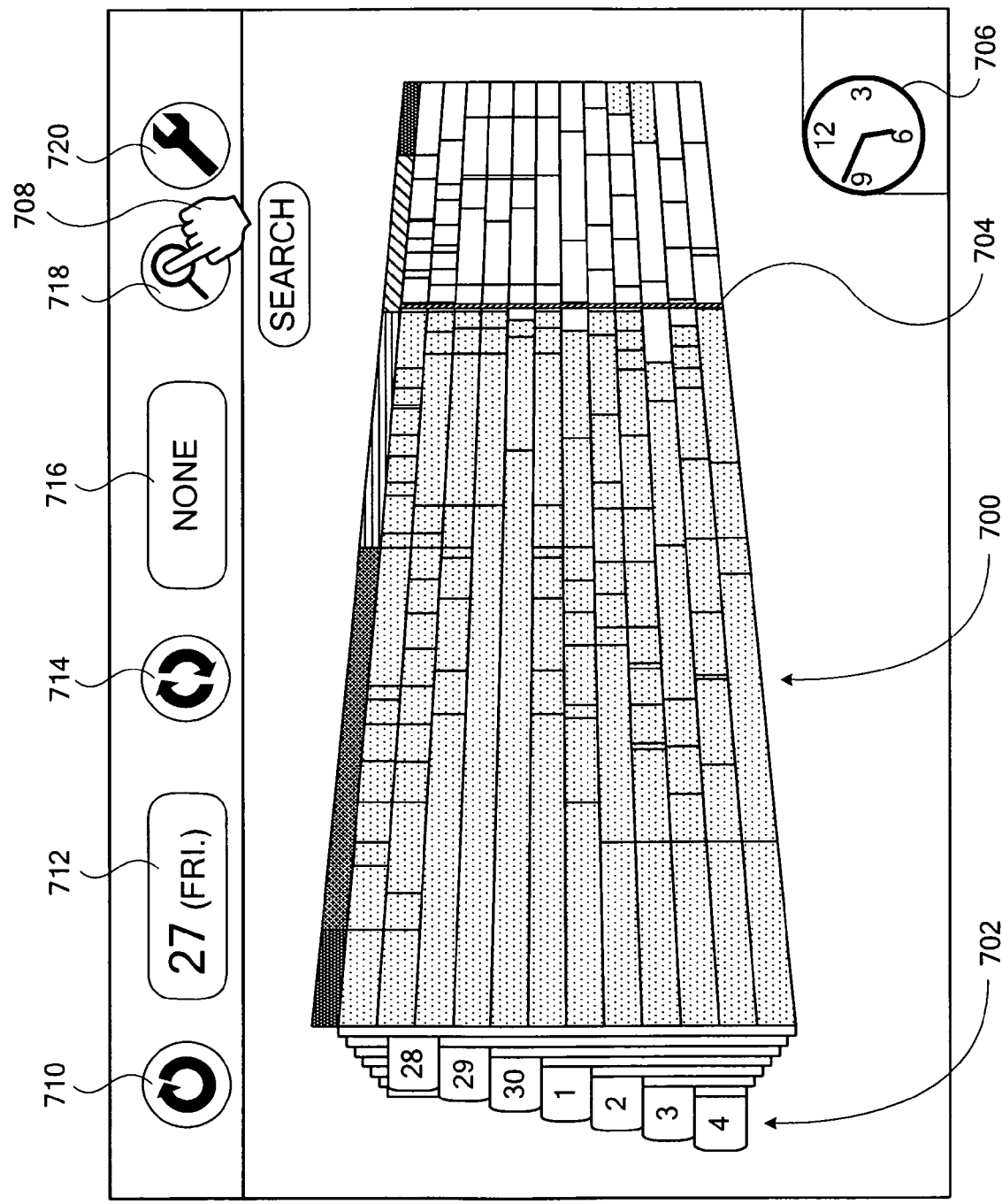
FIG. 10 is an illustrative view showing one example of the program guide displayed in a three-dimensional manner.

FIG. 10 shows one example of a screen on which the program guide 700 is displayed. As a camera location for depicting the program guide 700 of this screen, the second location for displaying the program guide as a whole shown in FIG. 9 is adopted, so that the whole of the plurality of plates forming the program guide 700 is entirely displayed in a three-dimensional manner.

The plate at the forefront is displayed with a program guide with a selected date, and each of the plates arranged at the back thereof is displayed with the date tubs 702 indicating the respective dates. It should be noted that at the start up, the today's date is selected, and the program guide indicating the today's date is displayed on the plate at the forefront. The information on the current date and time is fetched from the ROM/RTC 48.

The program guide of the forefront plate is displayed in a matrix manner by taking the vertical axis as a broadcast station axis and the horizontal axis as a time axis. At the top of the program guide, the time axis for indicating a broadcasting time is displayed, and the color of each of the display fields is color-coded so as to be easily viewed for each time slot. Here, the definition of the time slot is arbitrary, and in this embodiment, 24 hours a day is divided into five time slots. On the other hand, in the vertical direction, the fields for respective broadcast stations are aligned, and in the field for the broadcast stations, respective program information are arranged in chronological order. Each of the field of the program information is enclosed by a frame having a width corresponding to the broadcasting hours. However, in the three-dimensional display manner (second location), a main purpose is to view the overall program guide 700, so that only the frames are represented, and in each of the frames, characters representing the program information is not displayed. Here, characters representing the program information may be displayed within the frame.

In addition, in a case that the program guide at the forefront is for the current date, a vertical line 704 is displayed at a position corresponding to the current time. Furthermore, a clock 706 for indicating the current time is displayed at a bottom right corner of the screen. The programs before the current time have already been finished to be broadcasted, and therefore, the fields of the finished programs information arranged on the left side of the vertical line 704 are displayed in gray. Here, the field corresponding to the time when there is no program to be broadcasted (no program information) is also displayed in gray.

Each date tub 702 is displayed with a numerical for indicating each date. Furthermore, the direction of each date tub 702 is changed so as to be turned to the viewpoint direction of the camera location such that each date tub 702 is displayed to the front on the screen.

Additionally, on the screen, a pointer 708 representing an instructed position by the controller 22 is displayed. The display position of the pointer 708 is moved in correspondence to the instructed position by the controller 22.

On the upper part of the screen, various buttons 710, 712, 714, 716, 718 and 720 are provided. For example, the A button 26d is pushed with the pointer 708 moved over the display position of each button 710-720 to thereby select the button. Additionally, other buttons and items may also be selected by a similar operation.

The screen including the program guide like FIG. 10 is generated by composing the images, such as the upper part including the respective buttons 710-720 and the pointer 708, the clock 706, etc. with the image of the program guide 700 depicted on the basis of the camera location.

The button 710 is a button for returning to a menu screen of the game apparatus 12. When the button 710 is selected, the program guide displaying application is ended to thereby display the menu screen.

The button 712 is a button for switching the camera location. In a case that a program guide in the three-dimensional display manner is displayed, when the button 712 is selected, the camera location is changed to the first location shown in FIG. 9 to display a program guide in the two-dimensional display manner. On the other hand, in a case that a program guide in the two-dimensional display manner is displayed when the button 712 is selected, the camera location is changed to the second location shown in FIG. 9 to display a program guide in the three-dimensional display manner.

Furthermore, this button 712 is displayed with the date of the program guide which is currently being displayed. In the example shown in FIG. 10, a numeral indicating the date and a day of the week ("27 (Fri.)") are displayed. When the date of the program guide to be displayed is changed, the date of the button 712 is also changed. Here, the change of the date of the program guide can be performed by selecting the date tub 702, operating the cross key 26a, selecting the button 714, and so forth. Furthermore, in a case that the program guide on the current date is displayed, the button 712 may be displayed with a predetermined time period "today", for example, in place of a date and a day of the week (see FIG. 14, FIG. 15).

The button 714 is a button for successively forwarding the date of the program guide to be displayed. When the button 714 is selected, the date-sequential data is updated so that the sequence of the date whose program guide has been displayed just now is made rearmost and the order of the subsequent dates is advanced. On the screen, the plate with the date whose program guide has been displayed just now is moved to the rearmost position, and the plate with the next date is moved to the forefront, allowing the program guide to be displayed on the forefront plate. In addition, the date tub 702 with the date moved to the forefront is erased, and the date tub 702 with the date moved to the rearmost position is newly displayed.

The button 716 is a button for representing a situation of the search. When program information matching a search condition is present, a character indicating the search condition is displayed on the button 716, and a display manner of the button 716 is changed (see FIG. 14). The change in the display manner of the button 716 may be the same as a program information field and the date tub 702 described later, and for example, the color and the color tone are changed to those different from the normal ones. On the other hand, in a case that no search is performed, or in a case that program information matching the search condition is not present, "none" is displayed as shown in FIG. 10.

The button 718 is a button for performing a search. When the button 718 is selected, a search screen is displayed to allow a search for the program information by designating a search condition, such as a key word, a genre, etc. Furthermore, when the button 718 is selected in a state that the character string displayed on the program guide or the detailed screen is designated, it is possible to perform a keyword search by regarding the character string as a search condition. In FIG. 10, since the button 718 is instructed by the pointer 708, the character ("search") indicating the function of the button 718 is displayed in a pop-up. The search is described later.

The button 720 is a button for performing various settings. When the button 720 is selected, a screen for setting is displayed to allow various settings to be performed. Example is a setting of the current date and time, a setting of a broadcast station and a channel to be displayed on the program guide, etc.

Figure 11:
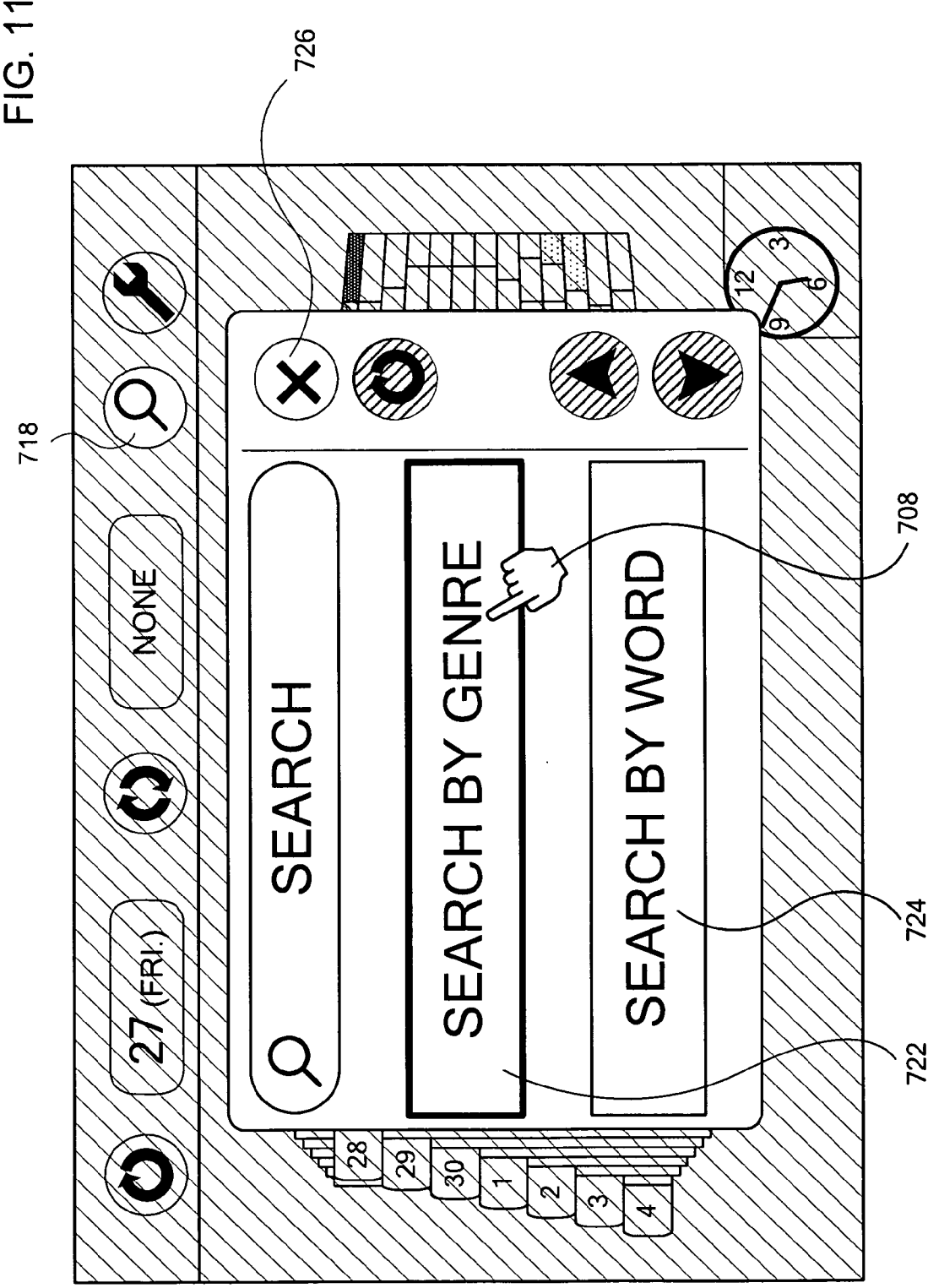
FIG. 11 is an illustrative view showing one example of a search menu screen.

When the button 718 is selected by the user, a search menu screen as shown in FIG. 11 is displayed so as to be overlapped with the program guide. On the search menu screen, a button 722 for performing a genre search and a button 724 for performing a keyword search are provided. Additionally, a button 726 in the upper right corner of the search menu screen is for cancelling a search.

Figure 12:
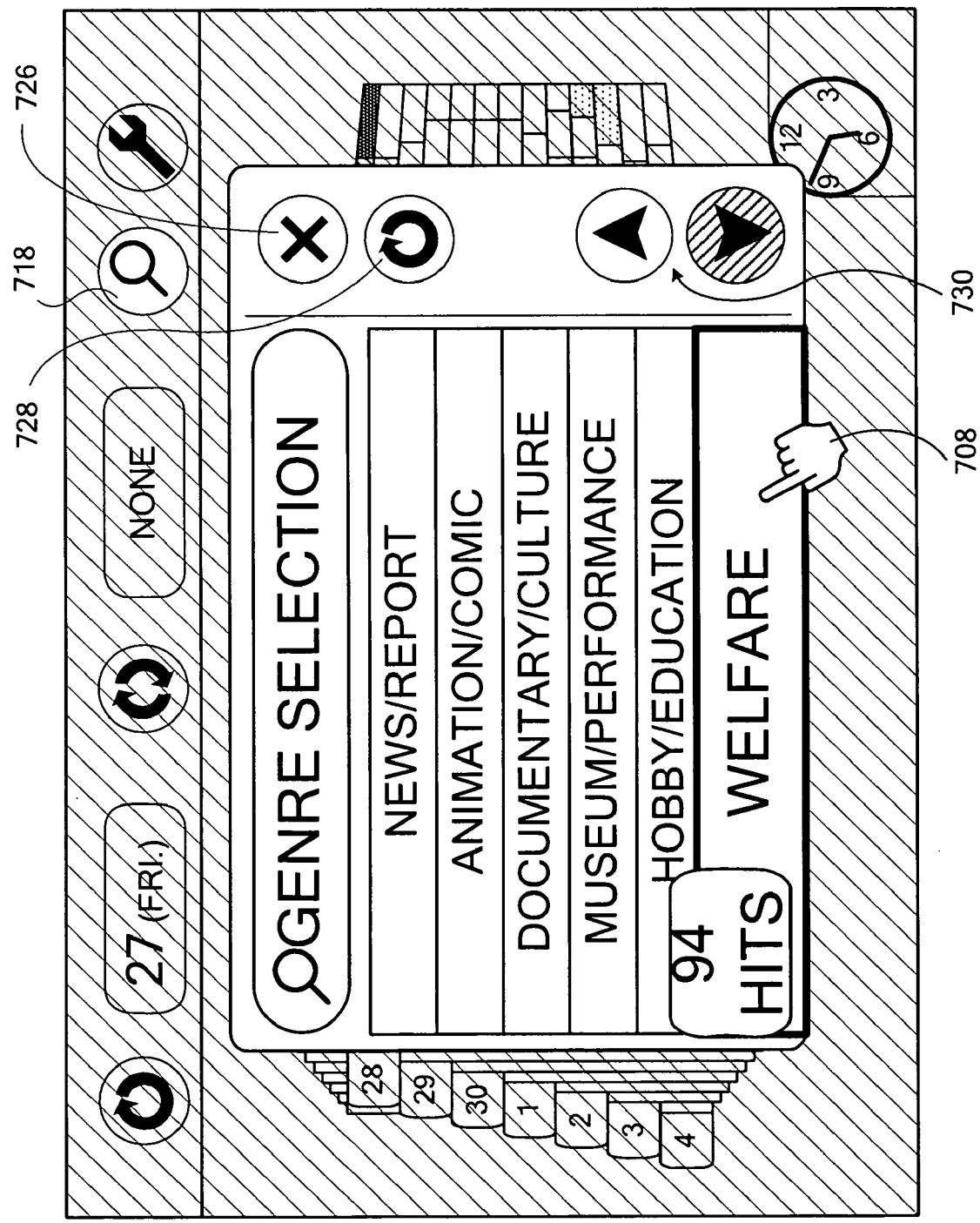
FIG. 12 is an illustrative view showing one example of a genre selecting screen.

In FIG. 11, the button 722 for the genre search is instructed with the pointer 708, and when the button 722 is selected, a genre selecting screen for the genre search is displayed as shown in FIG. 12. In the genre selecting screen, a plurality of genres set in advance are displayed as selectable menu items. As shown in FIG. 12, examples are "news/reports", "animation/comic", "documentary/culture", "museum/performance", "hobby/education", "welfare", etc. In FIG. 12, the item of "welfare" is instructed by the pointer 708, and the fact that the number of matching program information when a search is performed by regarding this genre as a search condition is 94 is displayed in a pop-up. In a case that such a count displaying function is provided, when the button 722 for genre search is selected on the screen in FIG. 11, a genre search of the program guide data is performed, and the number of matching program information for each genre is counted.

A button 728 below the cancel button 726 is a return button, and when the button 728 is selected, the screen returns to the previous search menu screen (FIG. 11). Furthermore, a button 730 is up and down scrolling buttons being made effective when the menu items are not within one screen, and are able to scrolling the menu item up and down.

Figure 13:
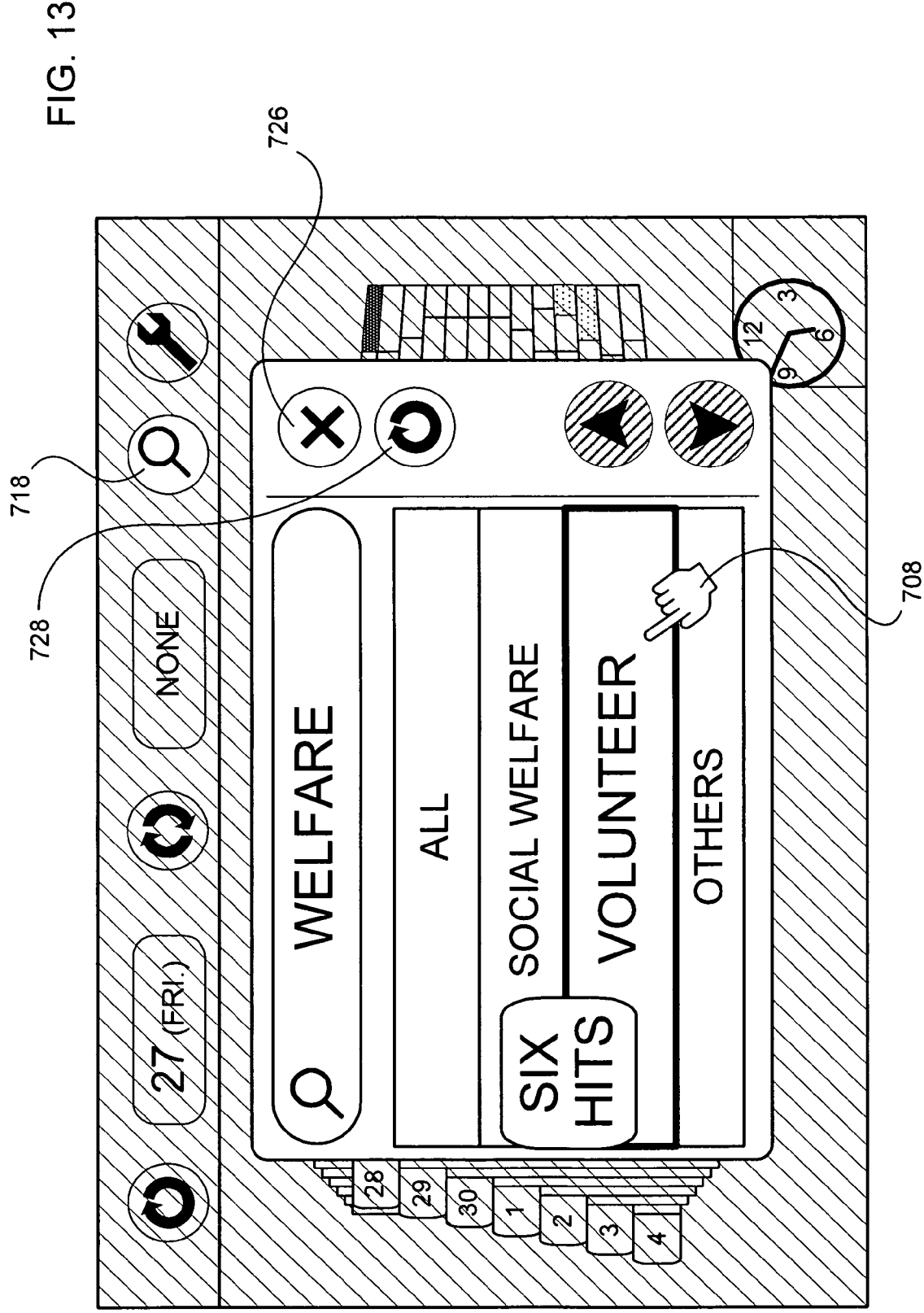
FIG. 13 is an illustrative view showing one example of a subgenre selecting screen.

Some genres are set with subgenres, if a genre having subgenres is selected, a subgenre selecting screen is displayed. FIG. 13 shows a subgenre selecting screen displayed when the "welfare" in FIG. 12 is selected. On the subgenre selecting screen, a plurality of subgenres set in advance are displayed as selectable menu items. Examples are subgenres of "all", "social welfare", "volunteer", "others", etc. In FIG. 13, the item of "volunteer" is instructed by the pointer 708, and the fact that the number of matching program information when a search is performed by regarding this subgenre as a search condition is 6 is displayed in a pop-up. Here, when the return button 728 is selected, the screen returns to the previous genre selecting screen (FIG. 12).

When a desired genre is selected on the genre selecting screen or the subgenre selecting screen, the genre is designated as a search condition to thereby perform program search-marking processing. In the genre search, the program information of the genre matching the genre of the search condition is determined so as to be marked.

On the other hand, when the button 724 is selected on the search menu screen in FIG. 11, a keyword search is performed. In the keyword search, although illustration is omitted, a keyword input screen having a software keyboard, for example, is displayed which allows a desired character string to be input by selecting a character key with the pointer 708. Furthermore, a history of the character strings input in the keyword search in the past is displayed, and by selecting the history with the pointer 708, it is possible to select a character string input in the past. When a character string is input or selected, program search-marking processing by taking the character string as a search condition is performed. In the keyword search, the program information including a character string matching the character string of the search condition in the program guide data (program name, genre and detailed information, etc) is determined so as to be marked.

Additionally, although illustration is omitted, the character strings displayed in the program guide, the character strings displayed on a detailed screen of the program information can also be designated as a search condition. More specifically, in the program guide in the two-dimensional display manner, a program name is displayed in the field of each program information (see FIG. 15). Also, a field of the program information is selected in the program guide in the two-dimensional display manner to thereby display the detailed screen of the program information. On the detailed screen, a program name, a broadcasting date and time, a broadcast station, channels, detailed information, etc. of the program information are displayed. By dragging a desired character string on the program information field or on the detailed screen, the user can selects the character string. The dragging operation is performed by instructing a desired character with the pointer 708, and then moving the pointer 708 with the A button 26*d* and the B trigger switch 26*i* simultaneously pushed. When the dragging operation is performed, the character string is displayed inverted, which shows a selecting state. Then, when the button 718 is selected in a state that the character string is selected, a keyword search is performed by designating the character string as a search condition.

Figure 14:
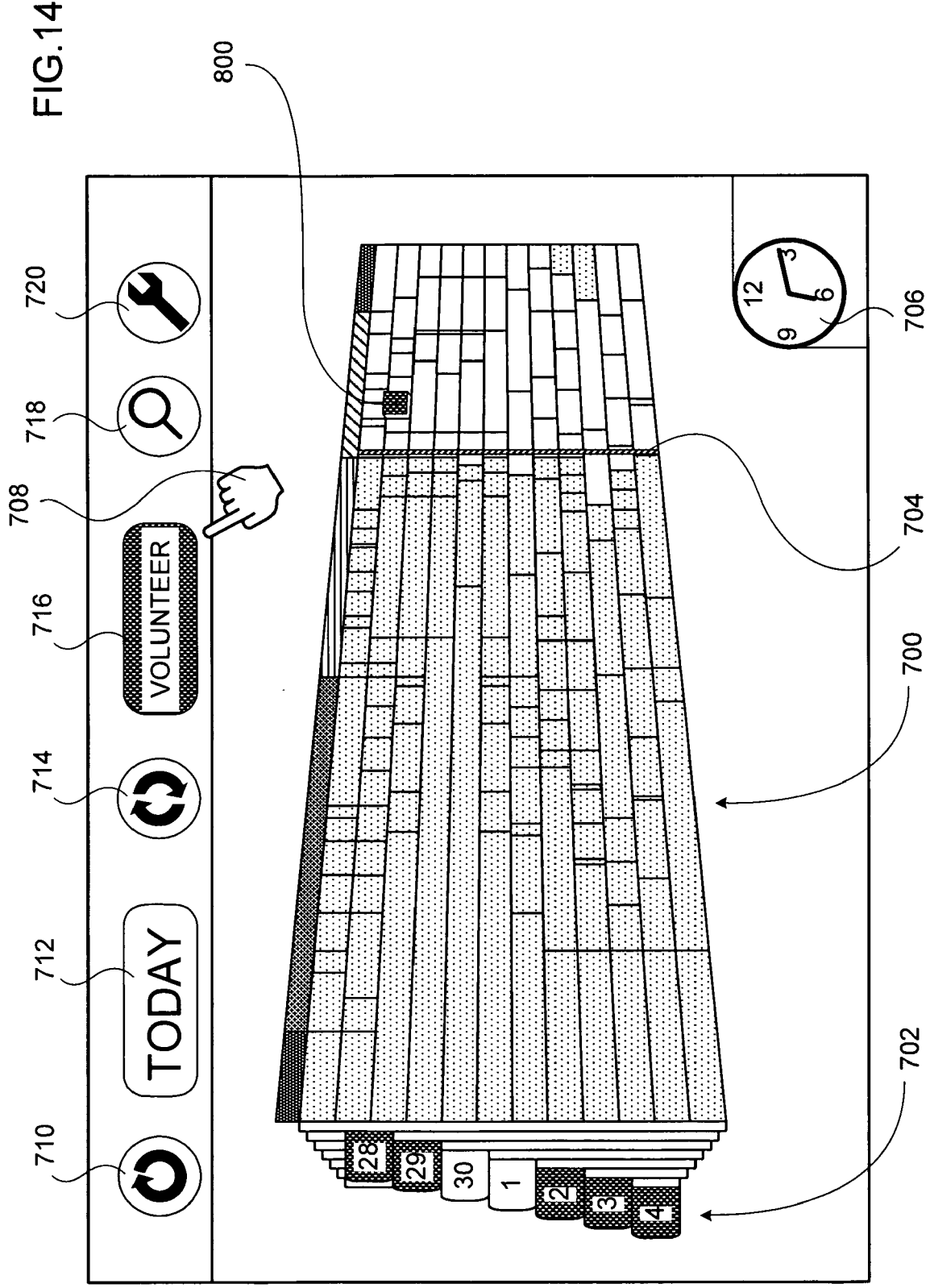
FIG. 14 is an illustrative view showing one example of a program guide displayed with a search result in a three-dimensional display manner.

When a search is performed with the search condition designated, the search result is displayed on the program guide. When a search is performed with the program guide in a three-dimensional display manner displayed, the search result is displayed in the program guide in the three-dimensional display manner as shown in FIG. 14. Furthermore, when a search is performed with the program guide in a two-dimensional display manner displayed, the search result is displayed in the program guide in the two-dimensional display manner as shown in FIG. 15. Here, selecting the button 712 allows the program guide to be displayed so as to be switched between the two-dimensional display manner and the three-dimensional display manner.

In a case that program information matching the search condition is present, a character string indicating the search condition is displayed on the button 716. In the example shown in FIG. 14 and FIG. 15, "volunteer" is described. In addition, the display manner of the button 716 is changed. In this embodiment, the color or the color tone of the button 716 is changed to a predetermined color or a predetermined color tone different from the normal color or color tone. For example, light purple in the normal state is changed to red.

Moreover, in a case that the program information matching the search condition is included in the plate at the forefront, i.e., the program guide displayed with the program information, a display manner of the program information is changed. In this embodiment, as shown in FIG. 14 and FIG. 15, the color or the color tone of the program information is changed to those different from the normal color or color tone. White in the normal state may be changed to red, or extremely light red is changed to dark red.

In addition, in the three-dimensional display manner, the height of the field of the program information is represented, and therefore, as denoted by the reference numeral "800", the height of the field of the program information matching the search condition is made higher so as to causes the field of the program information to be protruded from the main surface of the program guide in this embodiment. More specifically, a direction being orthogonal to the broadcast station axis and the time axis of the program guide in which the program information are formed in a matrix manner and being a near side of the screen is set to be a direction of the height, and a width in the direction of the height of the rectangular parallelepiped indicating the program information is made larger.

Here, in the three-dimensional display manner, only the frame of each of the program information is displayed, and when the user wants to confirm a program name, etc. of the program information changed in the display manner, he or she can switch the screen to the program guide in the two-dimensional display manner shown in FIG. 15 by selecting the button 712.

As understood from FIG. 15, in the program guide in the two-dimensional display manner, the program information in only a part of the broadcast stations and time slots is displayed, but by performing a predetermined operation with the controller 22, the user scrolls the program guide in the vertical direction or the horizontal direction, to thereby display the program information of other broadcast stations or time slots.

Alternatively, when the program information matching the search condition is included in the plate with the date tub 702 (the program guide of the date not displayed with the program information, or a program guide of the date which is not displayed on the screen in the two-dimensional display manner in this embodiment), the display manner of the date tub 702 corresponding to the plate (program guide) included in the program information is changed. In this embodiment, as shown in FIG. 14, the color or color tone of the date tub 702 is changed to a color or a color tone different from the normal ones. For example, white in the normal state is changed to red. In the example in FIG. 14, the display manner of the date tubs 702 with dates of 28, 29, 2, 3 and 4, is changed, and this makes it possible to easily determine that the program information matching the search condition is present in the program guide with those dates.

Since the program guide with the date corresponding to the date tub 702 whose display manner is changed is hidden, when the user wants to confirm the program information on that date corresponding to the date tub 702, he or she can sequentially change the date of the program guide to be displayed at the forefront by selecting the button 714, for example. Furthermore, by pushing a predetermined direction (right, for example) of the cross key 26*a*, the program guide is changed to a program guide on the next date, and by pushing another predetermined direction (left, for example) of the cross key 26*a*, the program guide is changed to a program guide on the previous (or rearmost) date. Alternatively, as described later, by directly selecting the date tub 702 with the pointer 708, it is possible to change to the program guide of the date of the date tub 702.

Furthermore, as understood from FIG. 15, in the program guide of the two-dimensional display manner, the broadcast station fields indicating the broadcast stations and the channels are composed and displayed at the left end of the screen, and the program guides are displayed next to the broadcast station fields. As shown in FIG. 15, in this embodiment, the date tubs 702 provided at the left end of the plate are constructed so as not to be displayed. Accordingly, when a program guide of another date is desired to be confirmed in the two-dimensional display manner, the date of the program guide is changed in order by making a selection with the button 714 in this embodiment.

However, in another embodiment, the program guide 700 may be configured so as to display the date tubs 702 on the screen. More specifically, the program guide 700 may be formed so as to have broadcast station fields at the left end of the plate, and the left edge of the broadcast station fields, the date tubs 702 may be provided. Or, a button for selecting each date is separately provided at an appropriate position on the screen, and a display manner of the button may be changed in correspondence to the search result similar to the date tubs 702.

Additionally, as in this embodiment, if colors or color tones of the field of the program information, the date tub 702 and the button 716 indicating a situation of the search after change are the same, that is, if the changes in the display manner of the filed of the program information, the date tub 702 and the button 716 are the same, it is possible to clearly represent the presence of the program information matching the search condition, and therefore, it is possible to easily determine the presence of that program information.

In addition, in the three-dimensional display manner, as described above, by selecting a date tub 702, the date of the program guide to be displayed can be changed. In a case that it is determined that the user intends to select the date tub 702 with the pointer 708, the camera location is switched from the second location to the third location in this embodiment. More specifically, when it is determined that the coordinates of the display position (instructed position by the controller 22) of the pointer 708 is within a predetermined area including the display position of the date tubs 702, by regarding that the user intends to perform a selecting operation of the date tubs 702, the camera location is changed from the second location to the third location. Here, as a predetermined area, for example, a part at the left of the vertical line along the left side of the plate of the program guide at the forefront on the screen is set. However, the set range of the predetermined area may be change as appropriate. For example, the set range is limited to the display position of the date tubs 702, or a range by a preset length from the left end of the screen may be adopted.

Figure 16:
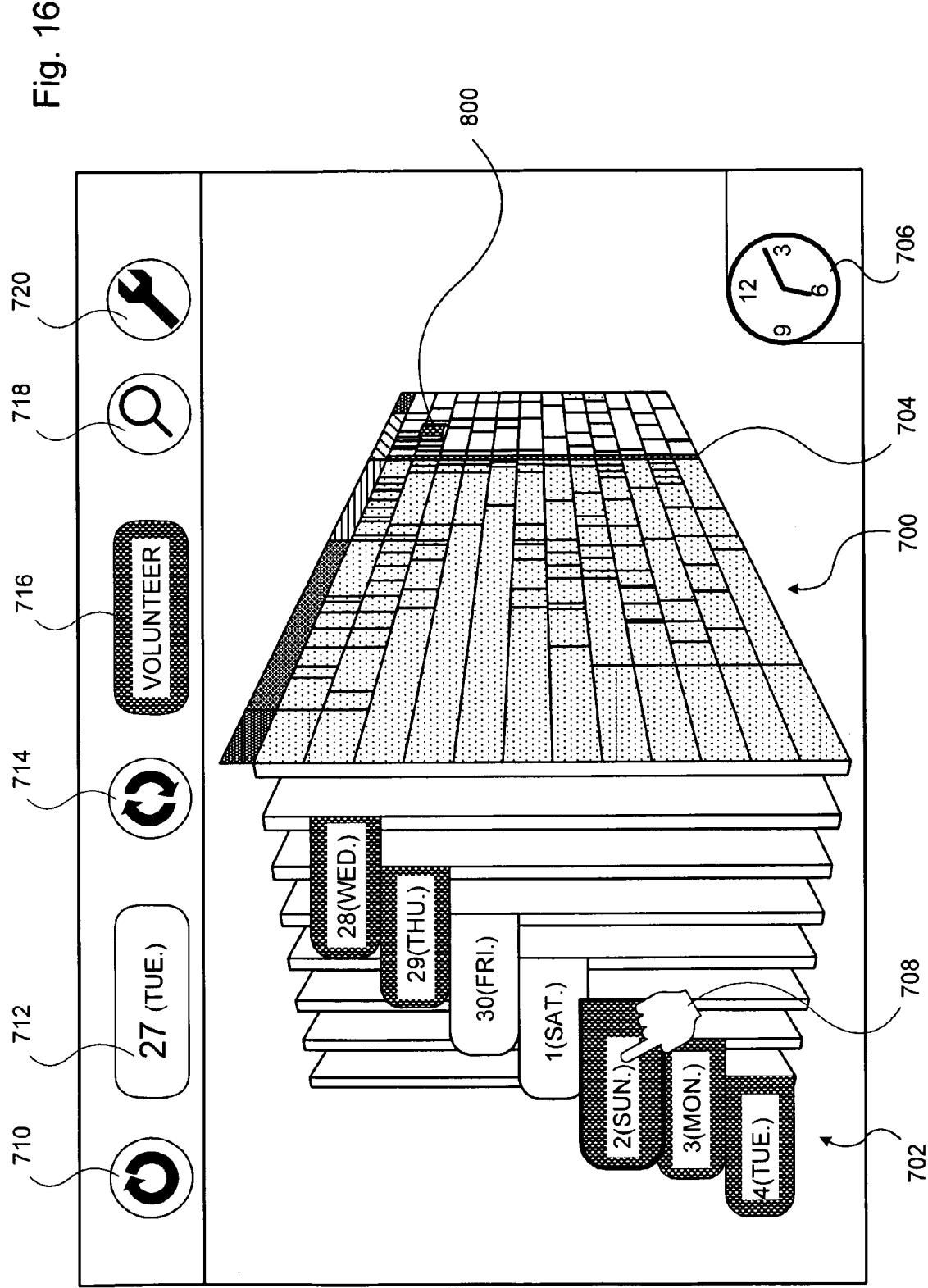
FIG. 16 is an illustrative view showing one example of the program guide in a three-dimensional display manner displayed when a date tub is selected.

When the pointer 708 enters the predetermined area in the three-dimensional display manner at the second location in FIG. 14, the camera location is switched to the third location to display a screen in which the date tubs 702 are zoomed in as shown in FIG. 16. In also the three-dimensional display manner by the third location shown in FIG. 16, it is possible to confirm the program information whose display manner is changed as shown in the reference numeral 800, and this makes it possible to easily determine that program information matching the search condition is present.

The third location is set to a position nearer the date tubs 702 than the second location, and therefore, in the three-dimensional display manner at the third location, it is possible to clearly display the date tubs 702. Accordingly, it is possible to make the date tub 702 changed in the display manner easily viewable and selectable. Furthermore, in this embodiment, the direction of the date tubs 702 are changed so as to be turned to the viewpoint of the virtual camera, and the date tubs 702 are displayed so as to be turned to the front on the screen, and therefore, it is possible to make the date tubs 702 more easily viewable. In addition, in this embodiment, the size of each of the date tubs 702 is changed in correspondence to the camera location. Specifically, the length (horizontal width) thereof in the third location is larger than that in the second location. Thus, as shown in FIG. 16, it is possible to describe not only the date but also a day of the week in the date tub 702. The display position (display area) of the date tubs 702 is made larger, moreover, the index to be displayed is more detailed, allowing the user to easily select the date tubs 702.

Moreover, in FIG. 16, in order to inform the user that the date tub 702 is instructed with the pointer 708, the date tub 702 instructed with the pointer 708 is highlighted by being made slightly larger and being changed in the color of the frame, for example.

Furthermore, as shown in FIG. 16, in the three-dimensional display manner by the third location, when it is determined that the coordinates of the display position of the pointer 708 are out of a predetermined area including the display position of the date tub 702, regarding that the user does not intend to select the date tub 702, the camera location is switched from the third location to the second location. It should be noted that as a predetermined area in a case of the third location, a part at the left of the vertical line along the left side of the plate of the program guide at the forefront on the screen is set, for example. Here, the third location is different from the second location, and therefore, the predetermined area in the third location is different from the predetermined area in the second location. Furthermore, the predetermined area in a case of the third location may be changed as in the above-described second location as appropriate. For example, the predetermined area may be limited to the display position of the date tubs 702, or the left half of the screen may be adopted.

Figure 17:
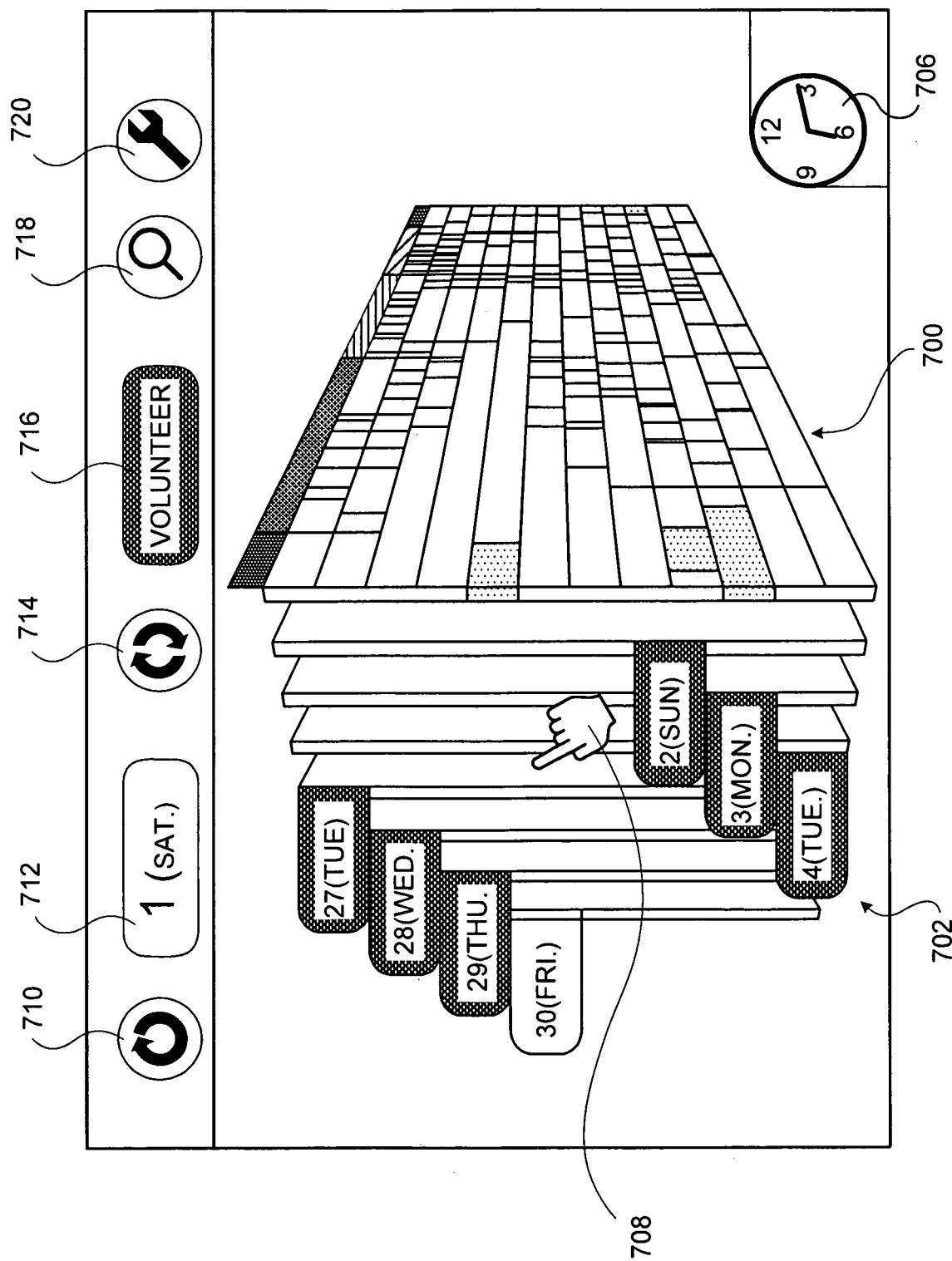
FIG. 17 is an illustrative view showing one example of the program guide in a three-dimensional display manner displayed when a date tub not including program information matching a search condition is selected.

When a date tub 702 is selected, the program guide corresponding to the date of that selected date tub 702 is displayed at the forefront as shown in FIG. 17. In addition, the example in FIG. 17 shows that the date tub 702 of "First (Sat.)" is selected. As understood from FIG. 16, the display manner of the date tub 702 of "First (Sat.)" is not changed, that is, program information matching the search condition is not present, and therefore, in the program guide at the forefront in FIG. 17, there is no field of the program information whose display manner is changed.

Thus, in this embodiment, in response to an operation by the user, the program guide 700 is displayed so as to be switched between the two-dimensional display manner and the three-dimensional display manner, and therefore, it is possible to switch the display manner according to the user's discretion, allowing the user to confirm the program guide 700 and the search result in a desired display manner. Specifically, as shown in FIG. 14, FIG. 16 and FIG. 17, in the three-dimensional display manner, the program guide 700 including the date tubs 702 is captured as a whole and represented in a three-dimensional manner, and therefore, it is possible to display the change in the display manner of the date tub 702 in an emphasized manner. In addition, as shown in FIG. 16 and FIG. 17, in a case that the date tub 702 is displayed so as to be zoomed in, the change in the display manner of the date tub 702 can be made more noticeable. Accordingly, even if the program information as a content is not displayed, the change of the display in the index part allows the user to easily determine the program information matching a search condition is present.

In addition, in also the three-dimensional display manner, the display manner (length and character, etc. in this embodiment) of the date tubs 702 are switched between the second location and the third location, and therefore, it is possible to determine easily and clearly that the program information matching a search condition is present, and it is possible to improve operability and viewability when the content to be displayed by selecting the date tub 702 as an index part is switched.

Additionally, in this embodiment, the directions of all the date tubs 702 are changed so as to be turned to the front depending on the camera location. However, in another embodiment, only the date tub 702 of the date including the program information matching a search condition may be changed in the direction depending on the camera location, and this makes it possible to further clearly show the presence or absence of the program information matching the search condition.

Furthermore, in this embodiment, the lengths of all the date tubs 702 are changed depending on the camera location. However, in another embodiment, only the date tub 702 of the date including the program information matching a search condition may be changed in the length depending on the camera location, and this also makes it possible to show the presence or absence of the program information matching the search condition more clearly.

Figure 18:
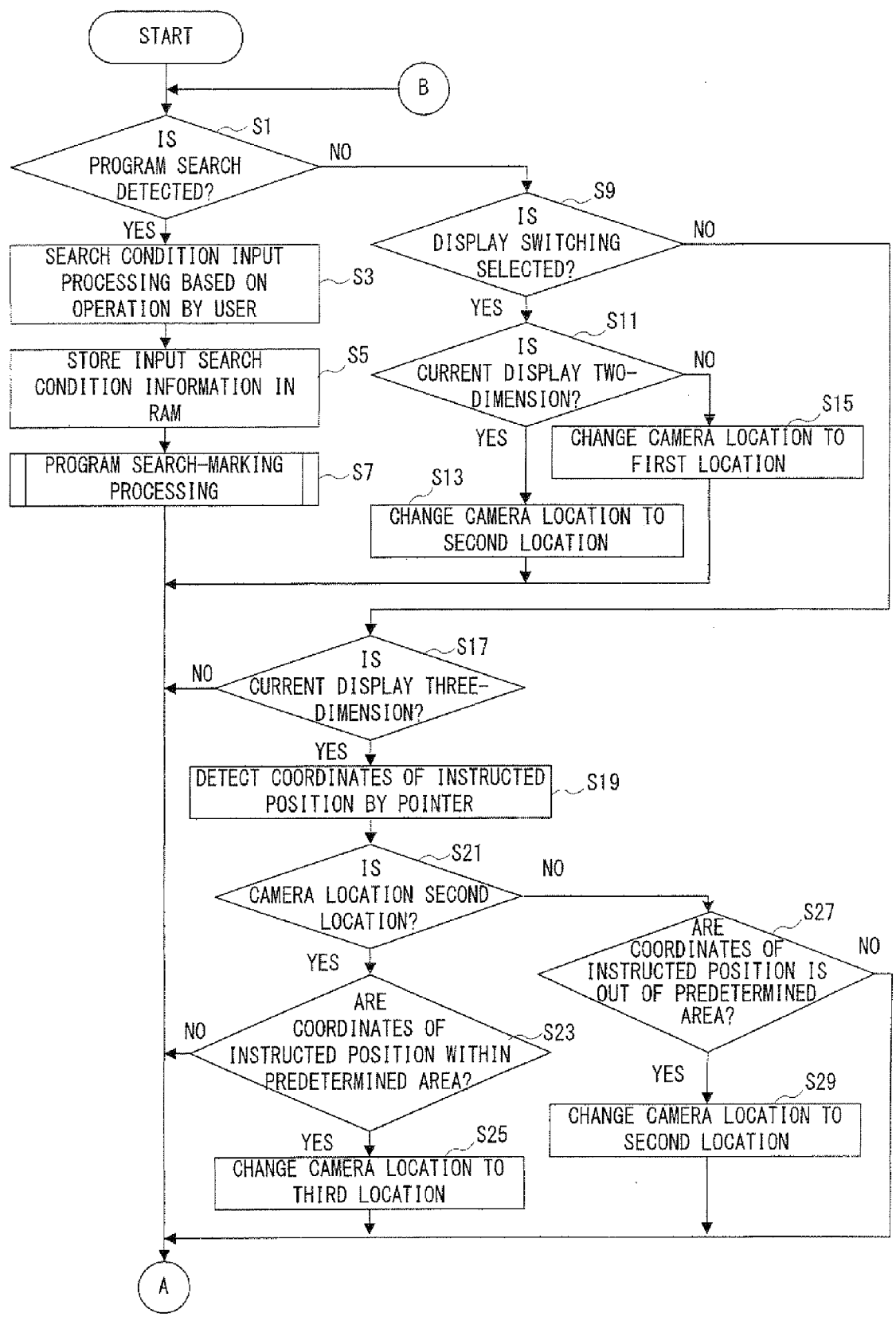
FIG. 18 is a flowchart showing a part of one example of an operation of the game apparatus.
Figure 19:
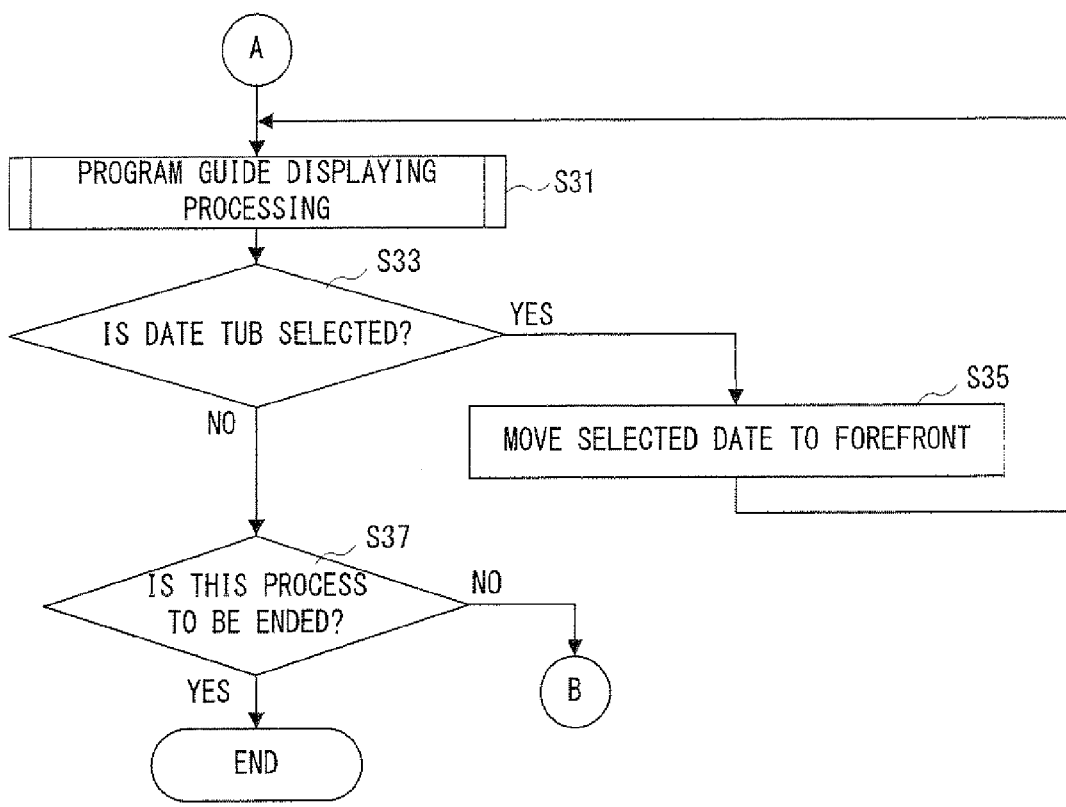
FIG. 19 is a flowchart showing a sequel to FIG. 18.

Each of FIG. 18 and FIG. 19 shows one example of an operation of the game apparatus 12. The CPU 40 determines whether or not a program search is selected in a step S1. More specifically, it is determined whether or not the button 718 for search is selected on the basis of the input data by the controller 22, the display position data of the button 718, etc.

Here, when it is determined that the A button 26*d* is pushed in a state that the coordinates indicating the display position of the pointer 708 are included in the display position of each of the various selecting objects, such as a button, a tub and an item, etc., it is determined that the selecting object is selected.

Furthermore, the input data of the controller 22 is periodically received via the wireless controller module 52, the input-output processor 42*a*, etc. so as to be stored in the buffer area of the external main memory 46*a*. The CPU 40 can detect for each frame the display state, coordinates of the instructed or designated position, etc. of the input means 26 of the controller 22 from the input data. Furthermore, the display position data (coordinate data, etc.) of the various selecting objects on the screen are stored in the data memory area 500 by reading the data stored in advance, calculating when generating the screen, and so forth.

If "YES" in the step S1, the CPU 40 executes search condition input processing on the basis of an input by the user according to the search condition designating program in a step S3. The processing for causing the user to designate a search condition in the genre search and keyword search as described above is performed. For example, in the genre search, a genre selecting screen, a subgenre selecting screen, etc. are displayed so as to have the user selecting a genre. In the keyword search, a keyword input screen is displayed so as to allow the user to input a character string, or to select a character string from the history. Alternatively, in a case that a character string in a program information field, a detailed screen, etc. is selected by a dragging operation, the character string is fetched as a search condition. The genre or character string indicating the input search condition is specified on the basis of the input data and the genre, the display position data of the character or the character string, and so on.

In a succeeding step S5, the CPU 40 stores the input search condition information in the RAM (external main memory 46). That is, the data indicating the designated character string or genre is stored in the search condition memory area 504.

Succeedingly, in a step S7, the CPU 40 executes program search-marking processing according to the search-marking program. By the processing, it is determined whether or not the program information matching the search condition is present, and the program information matching the search condition is marked. One example of an operation of the processing is shown in FIG. 20.

Figure 20:
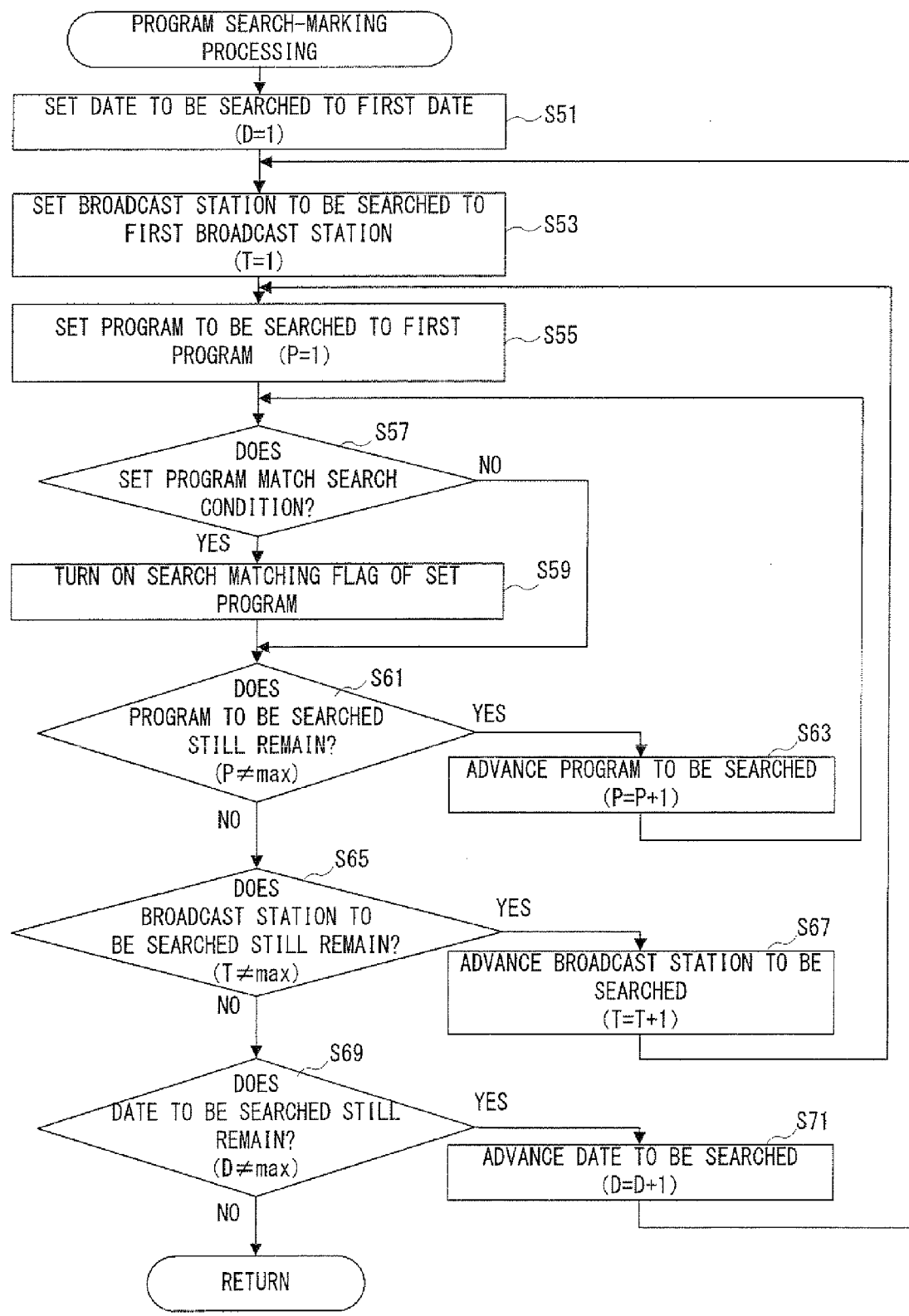
FIG. 20 is a flowchart showing one example of an operation of program search-marking processing shown in FIG. 18.

When starting the program search-marking processing, although omitted in FIG. 20, the CPU 40 assigns a consecutive number starting with "1" to each of the data with reference to the program guide data stored in the memory area 502, and detects the number of dates (maximum value), for example. In addition, the CPU 40 assigns a consecutive number starting with "1" to each of the registered broadcast station with reference to the program guide data, and detects the number of broadcast stations (maximum value). In addition, the CPU 40 assigns a consecutive number starting with "1" to each of the registered program information for each date and each broadcast station, and detects the number of program information (maximum value) for each date and each broadcast station.

In a step S51 shown in FIG. 20, the CPU 40 sets a date to be searched to the first date. More specifically, "1" indicating a number of the first date is set to a variable D indicating a date to be searched. Next, in a step S53, the CPU 40 sets a broadcast station to be searched to the first broadcast station. More specifically, "1" indicating a number of the first broadcast station is set to the variable T indicating a broadcast station to be searched. In a succeeding step S55, the CPU 40 sets a program to be searched to the first program. More specifically, "1" indicating a number of the first program information is set to a variable P indicating program information to be searched. It should be noted that the number of the program information is set for each date and broadcast station as described above.

Succeedingly, in a step S57, the CPU 40 determines whether or not the set program matches a search condition. That is, from the values of the variables D, T, P set as a program to be searched, a program ID of the searching object is specified, and with reference to the program guide data of the program ID, whether the program information matching the search condition or not is determined. For example, in a case of the genre search, it is determined whether or not the genre of the search condition is coincident with the genre of the program information. Furthermore, in a case of the keyword search, it is determined whether or not a character string coincident with the character string of the search condition is stored in the program guide data (program name, genre, detail information, etc.) of the program information.

If "YES" in the step S57, the CPU 40 turns on a search matching flag of the set program in a step S59, that is, the program information is marked. More specifically, the search matching flag corresponding to the program ID as a searching object is turned on in the program guide data memory area 502.

Thus, it is determined whether or not each of the plurality of program information and the search condition match, and the program information matching the search condition is marked. Moreover, in the program guide displaying processing described later, the display manner of the program information and the date tub 702 are changed depending on whether or not the program information is marked. This makes it possible to easily determine whether or not a content corresponding to the search condition is present for each of the program guide each having the plurality of dates with simple processing.

On the other hand, if "NO" in the step S57, that is, if the searching object does not match the search condition, the process proceeds to a step S61 as it is.

In the step S61, the CPU 40 determines whether or not a program to be searched still remains. More specifically, it is determined whether or not the value of the variable P corresponding to the date D and the broadcast station T has not been a maximum value. If "YES" in the step S61, the CPU 40 advances the program to be searched in a step S63. More specifically, the variable P for designating the program information is incremented by one to thereby set next program information as the program to be searched. After completion of the step S63, the process returns to the step S57. Accordingly, search and marking processing is performed on the next program information.

On the other hand, if "NO" in the step S61, that is, if the search and marking processing as to all the program information corresponding to the set date D and broadcast station T has been completed, the CPU 40 determines whether or not a broadcast station to be searched still remains in a step S65. More specifically, it is determined whether or not the value of the variable T has not become the maximum value. If "YES" in the step S65, the CPU 40 advances the broadcast station to be searched in a step S67. More specifically, the variable T for designating a broadcast station is incremented by one to thereby set a next broadcast station as the broadcast station to be searched. After completion of the step S67, the process returns to the step S55. Accordingly, the search and marking processing as to all the program information of the next broadcast station T of the set date D is performed.

Furthermore, if "NO" in the step S65, that is, if the search and marking processing as to all the program information of all the broadcast stations T of the set date D is ended, the CPU 40 determines whether or not a date to be searched still remains in a step S69. More specifically, it is determined whether or not the value of the variable D has not become the maximum value. If "YES" in the step S69, the CPU 40 advances the date to be searched in a step S71. More specifically, the variable D for designating a date is incremented by one to set a next date as the date to be searched. After completion of the step S71, the process returns to the step S53. Accordingly, the search and marking processing with respect to all the program information of all the broadcast stations of the next date is performed. Alternatively, if "NO" in the step S69, the search and marking processing with respect to all the program information is ended, and therefore, the program search-marking processing is ended, and then, the process proceeds to a step S31 in FIG. 19.

Furthermore, if "NO" in the step S1 in FIG. 18, the CPU 40 determines whether or not a display switching is selected in a step S9. More specifically, it is determined whether or not the button 712 for switching the camera location is selected on the basis of the input data, the display position data of the button 712, etc.

If "YES" is determined in the step S9, the CPU 40 determines whether or not the current display is a two-dimensional display in a step S11. More specifically, it is determined whether or not the first location capable of capturing the program guide 700 from the front is stored in the camera location memory area 506.

If "YES" in the step S11, that is, if switching is instructed in a state that the program guide in the two-dimensional display manner is displayed, the CPU 40 changes the camera location data in the memory area 506 to the second location capable of capturing the program guide 700 from the oblique left direction and from far in a step S13.

On the other hand, if "NO" in the step S11, that is, if switching is instructed in a state that the program guide in the three-dimensional display manner is displayed, the CPU 40 changes the camera location data in the memory area 506 to the first location capable of capturing the program guide 700 from the front in a step S15. After completion of the step S13 or S15, the process proceeds to the step S31 in FIG. 19.

Alternatively, if "NO" in the step S9, the CPU 40 determines whether or not the current display is a three-dimensional display in a step S17. More specifically, it is determined whether or not the second location or the third location is stored in the camera location memory area 506.

If "YES" in the step S17, that is, if the program guide in the three-dimensional display manner is displayed, processing for switching the camera location in correspondence to the instructed position by the pointer 708 is executed in succeeding steps S19-S29.

That is, in the step S19, the CPU 40 first detects coordinates of the instructed position by the pointer 708. As described above, since the input data of the controller 22 periodically received are stored in the buffer of the external main memory 46, the data indicating the instructed position with the controller 22 from the input data is extracted, and on the basis of that data, the coordinate (displayed position coordinate) of the instructed position by the pointer 708 is calculated or fetched.

In the succeeding step S21, the CPU 40 determines whether or not the camera location of the memory area 506 is the second location. If "YES" in the step S21, the CPU 40 determines whether or not the coordinates of the instructed position are within the predetermined area corresponding to the second location in the step S23. That is, it is determined whether or not the pointer 708 enters the predetermined area including the display position of the date tub 702 in the three-dimensional display manner by the second location. If "YES" in the step S23, that is, if it is determined that the user intend to select the date tub 702 by the pointer 708, the CPU 40 changes the camera location data in the memory area 506 to the third location in the step S25.

On the other hand, if "NO" in the step S21, that is, if the camera location is the third location, the CPU 40 determines whether or not the coordinates of the instructed position is out of a predetermined area corresponding to the third location in the step S27. That is, it is determined whether or not the pointer 708 goes out of the predetermined area including the display position of the date tub 702 in the three-dimensional display manner by the third location. If "YES" in the step S27, that is, if it is determined that the user does not intend to select the date tub 702 with the pointer 708, the CPU 40 changes the camera location of the memory area 506 to the second location in the step S29.

After completion of the step S25 or S29, the process proceeds to the step S31 in FIG. 19. Alternatively, if "NO" in the step S23, if "NO" in the step S27, or if "NO" in the step S17, the process proceeds to the step S31 as it is.

In the step S31 in FIG. 19, the CPU 40 executes program guide displaying processing according to the program guide displaying program, the search result displaying program, etc. Thus, a program guide according to the camera location is displayed, and the search result is displayed in the program guide. One example of the operation of the program guide displaying processing is shown in FIG. 21 and FIG. 22.

Figure 21:
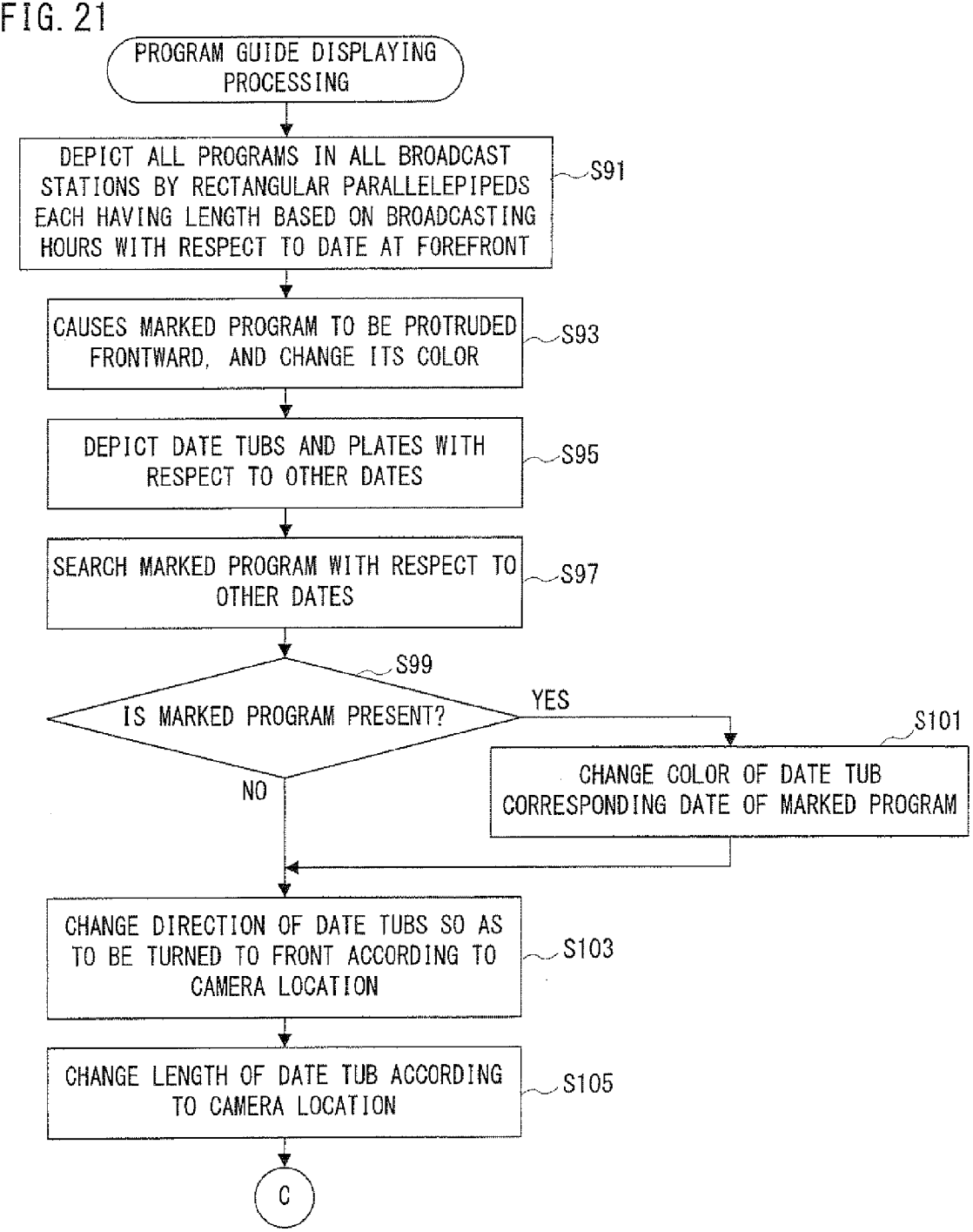
FIG. 21 is a flowchart showing a part of one example of an operation of program guide displaying processing shown in FIG. 18.
Figure 22:
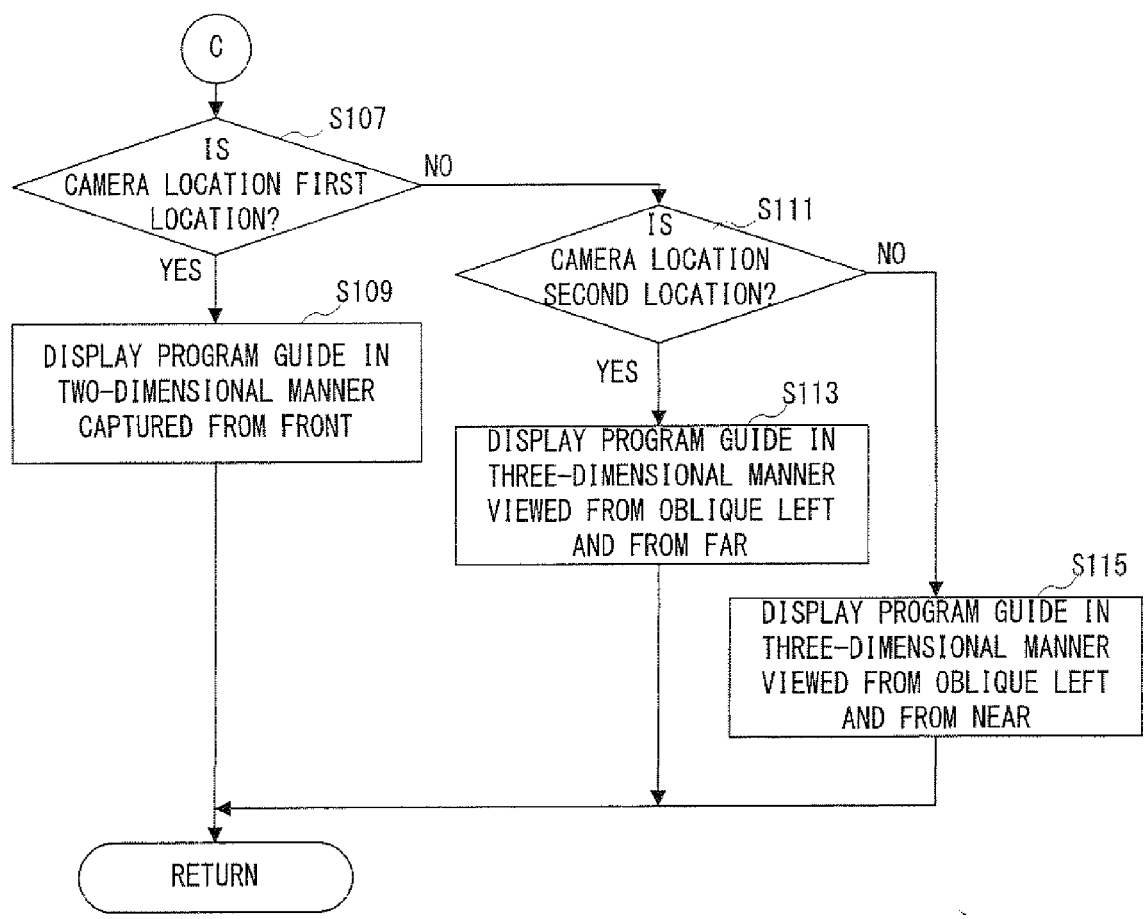
FIG. 22 is a flowchart of a sequel to FIG. 21.

When starting the program guide displaying processing, the CPU 40 depicts each of all the programs in all the broadcast stations by rectangular parallelepipeds each corresponding to the length of the broadcasting hours with respect to the date at the forefront in a step S91 shown in FIG. 21. More specifically, the CPU 40 specifies the date of the forefront plate from the date-sequential data in the memory area 508, and generates in the memory area 512 the content part data including a position and a display manner, etc. of each rectangular parallelepiped by being brought into correspondence to the program ID of the program information of that date with reference to the data corresponding to that date out of the program guide data in the memory area 502. Additionally, the size (length) of each rectangular parallelepiped is set to the length corresponding to broadcasting hours, and the position of each rectangular parallelepiped is calculated on the basis of a broadcast station, a starting time, etc.

Next, in a step S93, the CPU 40 causes the marked program to be protruded frontward and the color to be changed. In addition, the marked program can be specified by detecting a program ID whose search matching flag is turned on with respect to the date at the forefront plate with reference to the program guide data memory area 502. Then, in the content part data of the memory area 512, display manner data (height and color or color tone in this embodiment) of the program information (rectangular parallelepiped) corresponding to the program ID is changed to a predetermined height and color or color tone. That is, in the displayed program guide, the display manner of the program information matching the search condition is changed.

Successively, in a step S95, the CPU 40 depicts date tubs and plates with respect to the other dates. More specifically, the CPU 40 detects the other dates and its order from the date-sequential data of the memory area 508 to generate index part data including a position, a display manner, etc. of each date tub 702 in the memory area 510, and to generate data for controlling the display of the other plates in the data memory area 500.

Furthermore, in this embodiment, the date tub 702 is not provided to the forefront program guide, and therefore, index part data corresponding to the date at the forefront is not generated. Thus, with respect to the program guide on the selected date (at the forefront), only the program information as a content is displayed, and with respect to the program guide of the other dates, only the date tubs 702 as an index are displayed, so that it is possible to clearly distinguish the selected program guide and the other program guides.

In a succeeding step S97, the CPU 40 searches a marked program with respect to the other dates. More specifically, it is determined whether or not a program whose search matching flag is turned on is present with respect to each of the other dates with reference to the program guide data memory area 506.

Then, in a step S99, the CPU 40 determines whether or not a marked program is present with respect to each of the other dates. That is, it is determined whether or not a date including a program whose search matching flag is turned on is present with respect to other dates. If "YES" in the step S99, the CPU 40 changes the display manner data (color or color tone in this embodiment) of the date tub 702 corresponding to the date of the marked program to a predetermined color or a predetermined color tone in the index part data in a step S101. That is, in a case that the program information matching the search condition is included in the program guide corresponding to the displayed date tub 702, the display manner of that date tub 702 is changed. Alternatively, if "NO" in the step S99, the process directly proceeds to a step S103.

In the step S103, the CPU 40 changes the direction of the date tubs 702 so as to be turned to the front according to the camera location. More specifically, with reference to the camera location data in the memory area 506, the direction data of each date tub 702 is changed in the index part data such that the date tubs 702 are turned to the viewing direction of that camera location. Here, the direction of the date tub 702 may be calculated on the basis of the camera location data, but the viewing direction of each camera location is fixed in this embodiment, and therefore, predetermined direction data for each camera location may be decided in advance.

In a succeeding step S105, the CPU 40 changes the length of the date tub 702 according to the camera location. More specifically, in the index part data, the length data of each date tub 702 is changed to a predetermined length according to the camera location. Thus, the length in a case of the third location is set so as to be made longer than the length in a case of the second location, so that for the third location, the display area of each date tub 702 is made larger, allowing a date and a day of week to be described in each date tub 702 as shown in FIG. 16, for example.

Successively, in the processing from the step S107 to the step S115 in FIG. 22, the CPU 40 generates image data of the screen displaying a program guide corresponding to the camera location on the basis of the program guide data, the index part data, the content part data, the image data, etc. in the VRAM 42*d* by utilizing the GPU 42*b*, and displays the image on the monitor 34 via the AV IC 56, etc.

More specifically, the CPU 40 determines whether or not the camera location of the memory area 506 is the first location in the step S107, and if "YES", the CPU 40 performs depicting processing and display outputting processing on the basis of the first location by utilizing the GPU 42*b*, etc., and displays the program guide 700 in the two-dimensional manner viewed from the front in the step S109. This makes it possible to display the screen including the two-dimensional program guide as shown in FIG. 15 on the monitor 34. In the program guide, if program information matching the search condition is present, the program information changed in the display manner is displayed.

Alternatively, if "NO" in the step S107, the CPU 40 determines whether or not the camera location of the memory area 506 is the second location in the step S111. If "YES", the CPU 40 performs depicting processing and display outputting processing on the basis of the second location by utilizing the GPU 42*b*, etc., and displays the program guide 700 in the three-dimensional display manner viewed from the oblique left and from far in the step S113. Thus, the screen including the program guide captured by the three-dimensional display image as a whole as shown in FIG. 10 is displayed on the monitor 34. If there is program information matching the search condition in the program guide, the program information 800 changed in the display manner is displayed as shown in FIG. 14, and with respect to the date corresponding to the program information matching the search condition, the date tub 702 changed in the display manner is displayed.

On the other hand, if "NO" in the step S111, that is, if the camera location is the third location, the CPU 40 performs depicting processing and display outputting processing on the basis of the third location by utilizing the GPU 42*b*, etc., and displays the program guide 700 in the three-dimensional display manner viewed from the oblique left and from near in the step S115. In that case, the screen including the three-dimensional image of the program guide with the date tubs 702 zoomed in as shown in FIG. 16 is displayed on the monitor 34. Thus, in this program guide, if program information matching the search condition is present, the date tub 702 and the program information 800 whose display manner is changed are displayed.

After completion of the program guide displaying processing, the process returns to a step S33 shown in FIG. 19. In the step S33, the CPU 40 determines whether or not the date tub 702 is selected. That is, it is determined whether or not an operation of updating the date of the program guide at the forefront on which the program information is displayed is performed. More specifically, it is determined whether or not a selection of the date tub 702, a selection of the button 714 or an operation of the cross key 26*a* is present on the basis of the input data, the display position data of each selecting object, etc.

If "YES" in the step S33, the CPU 40 moves the selected date to the forefront in a step S35. More specifically, when the date tub 702 is selected, the date of that selected date tub 702 is specified, and the date-sequential data of the memory area 508 is updated such that the selected date is at the forefront, and the date before the selected date is at the rearmost position. Furthermore, when the button 714 is selected, or when the right direction of the cross key 26*a* is pushed, the date-sequential data is update such that the date currently at the forefront is moved down to the rearmost position, and the dates at the second onward are moved up. In addition, when the left direction of the cross key 26*a* is pushed, the date-sequential data is updated such that the date currently at the rearmost position is moved up to the forefront, and the order of the other dates is moved down. After completion of the processing in the step S35, the process returns to the step S31. Accordingly, the program guide displaying processing is executed in the step S31 to thereby display the program information of the selected date of the program guide at the forefront.

Alternatively, if "NO" in the step S33, the CPU 40 determines whether or not the program guide displaying application is to be ended in a step S37. For example, it is determined whether or not the button 710 is selected on the basis of the input data, the display position data of the button 710, etc. If "NO" in the step S37, the process returns to the step S1 shown in FIG. 18 while if "YES", the program guide displaying application is ended.

According to this embodiment, with respect to the display information whose content (program information) matching a search condition is displayed, the display manner of the content is changed, and with respect to the display information whose content (program information) matching a search condition is not displayed, the display manner of the index part (date tub 702) corresponding to the content is changed, and therefore, it is easily determine whether or not a content matching the search condition is present between the display information displayed with the content and the display information not displayed with the content.

In the above-described embodiment, as a change in the display manner when the search condition is matched, a color or a color tone of the content or the index part is changed, and a height of the content (presence or absence of a protrusion) is changed. However, the change in the display manner may be made as appropriate. In another embodiment, whether or not a search condition is matched may be represented by an inversed black-and white video, a change in a shape of the content and the index part, a change in a character size and font of the content and the index part, a presence or absence of a symbol mark, an underline, an enclosure of the frame, etc.

Furthermore, in each of the above-described embodiments, the program information for one day arbitrarily selected is displayed on the program guide at the forefront, and as to the other dates, the date tubs 702 are displayed. In a still another embodiment, the program guide for two or more days may be displayed, and as to the other dates, the date tubs 702 may be displayed. That is, as display information for displaying the content part, two or more display information may be displayed.

In addition, in each of the above-described embodiments, as an index of the content in the electronic program guide, a date is adopted, and a program guide for each date is constructed, but in another embodiment, the index may be a genre, a broadcast station, a time, etc. of the program. In a case that a broadcast station is adopted as an index, for example, a program guide formed by a date axis and a time axis for each broadcast station may be constructed as a content part.

Additionally, in each of the above-described embodiment, a tub is formed as an index part, but the form of the index part may be changed as appropriate. In another embodiment, as an index part, a button arranged at a position spaced from the content part, a speech balloon drawn from the content part, etc. may be formed, for example.

In addition, in each of the above-described embodiments, as to the program guide on which the program information is displayed, a date tub 702 is not displayed. That is, with respect to the display information which is being currently displayed, only the content part is displayed, and the index part is not displayed. However, as to the display information which is being currently displayed, if at least a content part is displayed, the index part may be displayed or may not be displayed. Accordingly, in a further embodiment, the index part of the display information which is being currently displayed may also be displayed. In that case, the display manner of the index part may also be changed depending on the presence or absence of the content matching the search condition similar to the other index parts.

Furthermore, in each of the above-described embodiments, a display manner of the index part corresponding to the content matching the search condition is changed. However, the change of the index part is not restricted to the change of the display manner of the index part matching the search condition. If the display manner of the displayed index part is changed according to a search result, it is possible to clearly show whether or not a content matching the search condition is present. More specifically, in each of the above-described embodiments, the index part not including the content matching the search condition is also displayed as it is, but in another embodiment, the index part which does not match the search condition may not be displayed, that is, the index part which does not match the search condition is erased, and only the index part which matches the search condition may be displayed. The display manner of the index part is changed as a whole such that only the index part corresponding to the content matching the search condition is displayed, and therefore, it is possible to more clearly show the presence or absence of the content matching the search condition. Only the index part matching the search condition is made selectable, and therefore, it is possible to allow the user to easily select the index part. In that case also, by changing the display manner of the index part corresponding to the content matching the search condition, the index part may be more enhanced.

In each of the above-described embodiments, a case of executing the application of displaying an electronic program guide is explained, however other example embodiments may be applied to an application of displaying various contents. Each of FIG. 23 and FIG. 24 shows one embodiment applied to a display of a possessed item list during execution of a game program.

In the possessed item list of this embodiment, a plurality of item are classified into kinds. That is, in a content part 900, items for each kind are displayed, and in an index part 902, the kinds of the items are displayed. In this embodiment, the index part 902 is formed as buttons, and by selecting the button, items to be displayed in the content part 900 are switched. In this embodiment, "weapon", "skull", "armor" and "shield" buttons are displayed.

FIG. 23(A) shows a case that the "weapon" button is selected, and FIG. 23(B) shows a case that the "armor" button is selected. In order to clearly show which item of which kind is displayed, the button 902 corresponding to the kind of the items displayed in the content part 900 and the panel indicating the content part 900 are connected with a leading line. Additionally, in this embodiment, the button corresponding to the kind of the items displayed in the content part 900 is also displayed together with the buttons of other kinds. In the panel indicating the content part 900, each of the plurality of items of the selected kind is arranged in a frame arranged in a matrix manner, for example.

FIG. 24 shows a possessed item list with a search result displayed, FIG. 24(A) shows a case that the "weapon" button is selected, and (B) shows a case that the "armor" button is selected. On the upper portion of the screen, a display field 904 for a search condition is provided, and in the example shown in FIG. 24, the "steel" is designated as a search condition. Here, a designating method of the search condition may be similar to that in the above-described program guide displaying application. For example, an search condition input screen is displayed in response to an operation of a predetermined input means (B trigger switch 26i, for example) of the controller 22 and a selection of a search button (not illustrated) on the screen, and a search condition may be designated by an input of a character string or a selection from the list on the search condition input screen, or a search condition may be designated by an instruction by a dragging operation of a character string displayed on the possessed item list.

When a search condition is designated, search-marking processing similar to that in the above-described program guide displaying application is executed. For example, it is determined for each kind whether or not an item matching the search condition is present, and an item matching the search condition is marked. Specifically, in the program search-marking processing in FIG. 20, a kind to be searched is set instead of a date to be searched, and an item to be searched is set instead of a program to be searched. Here, there is no alternative to a broadcast station to be searched in this embodiment.

Then, in the displayed content part 900, a display manner (color or color tone in this embodiment) of the marked item is changed. In addition, a display manner (color or color tone in this embodiment) of the index part 902 is changed according to the search result. In FIG. 24 example, the display manner of the button 902 corresponding to the kind including the marked item is changed. For example, in FIG. 24(A), the display manner of the "armor" button 902 whose content is not displayed in the content part 900 is changed, and therefore, it is possible to easily determine that an item matching the search condition is present also in that kind. When the "armor" button 902 is selected, items whose kinds are "armor" are displayed in the content part 900 as shown in FIG. 24(B), and in that kind, the display manner of the marked item is changed. Thus, it is possible to confirm the item matching the search condition out of the items of this kind.

Although the above embodiments have been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium storing computer-readable instructions for performing an information processing method for use on an information processing apparatus that includes at least one processor, the information processing apparatus configured to output information to a display device, the information included among a plurality of presentation sections, each one of the plurality of presentation sections associated with an index, each one of the plurality of presentations sections including at least some of the information, the stored instructions comprising instructions configured to cause said information processing apparatus to execute:
displaying at least one of the plurality of presentation sections;
displaying the indexes of a remainder of the plurality of presentation sections;
receiving a search condition;
searching the information based on the search condition to identify matching information;
changing a display characteristic of the matching information when the matching information is included in the at least one of the plurality of presentation sections that is displayed; and
changing a display characteristic of the displayed indexes that are associated with presentation sections based on a result of the matching information.

2. The medium of claim 1, wherein the result is the matching information.

3. The medium of claim 2, wherein each one of the plurality of presentation sections is a virtual plate and the stored instructions are further configured to cause the information processing apparatus to execute:
marking a content block of the information when the content block is coincident with the search condition;
changing a display characteristic of the marked content block for content blocks included in the at least one plate of the plurality of plates that are displayed; and
changing a display characteristic of the displayed indexes that are associated with plates that include marked content blocks.

4. The medium of claim 2, wherein only the at least one of the plurality of presentation sections and the indexes of the remainder of the plurality of presentation sections are displayed.

5. The medium of claim 2, wherein the display characteristic of the matching information and the display characteristic of the displayed indexes both include a color or color tone.

6. The medium of claim 2, wherein:
the information includes a program guide with a plurality of dates,
each one of the plurality of presentations sections is set to present the respective information in a grid form based on time and broadcast station, and
the index includes a date that is associated with the information of the respective presentation section.

7. The medium of claim 2, wherein the stored instructions are further configured to cause the information processing apparatus to execute switching the displayed at least one of the plurality of presentation sections and the displayed indexes to a three-dimensional display from a two-dimensional display or to a two-dimensional display from a three-dimensional display.

8. The medium of claim 2, wherein the displayed at least one of the plurality of presentation sections and the displayed indexes and displayed through a virtual camera and the stored instructions are further configured to cause the information processing apparatus to execute:
changing a location of the virtual camera based on input from a user input device; and
adjusting the display characteristic of displayed indexes based on the location.

9. The medium of claim 1, wherein each one of the plurality of presentation sections is a virtual plate and the stored instructions are further configured to cause the information processing apparatus to execute:
marking a content block of the information when the content block is coincident with the search condition;
changing a display characteristic of the marked content block for content blocks included in the at least one plate of the plurality of plates that are displayed; and
changing a display characteristic of the displayed indexes that are associated with plates that include marked content blocks.

10. The medium of claim 9, wherein only the at least one of the plurality of presentation sections and the indexes of the remainder of the plurality of presentation sections are displayed.

11. The medium of claim 9, wherein the display characteristic of the matching information and the display characteristic of the displayed indexes both include a color or color tone.

12. The medium of claim 9, wherein:
the information includes a program guide with a plurality of dates,
each one of the plurality of presentations sections is set to present the respective information in a grid form based on time and broadcast station, and
the index includes a date that is associated with the information of the respective presentation section.

13. The medium of claim 9, wherein the stored instructions are further configured to cause the information processing apparatus to execute switching the displayed at least one of the plurality of presentation sections and the displayed indexes to a three-dimensional display from a two-dimensional display or to a two-dimensional display from a three-dimensional display.

14. The medium of claim 9, wherein the displayed at least one of the plurality of presentation sections and the displayed indexes and displayed through a virtual camera and the stored instructions are further configured to cause the information processing apparatus to execute:
changing a location of the virtual camera based on input from a user input device; and
adjusting the display characteristic of displayed indexes based on the location.

15. The medium of claim 1, wherein only the at least one of the plurality of presentation sections and the indexes of the remainder of the plurality of presentation sections are displayed.

16. The medium of claim 1, wherein the display characteristic of the matching information and the display characteristic of the displayed indexes both include a color or color tone.

17. The medium of claim 1, wherein:
the information includes a program guide with a plurality of dates,
each one of the plurality of presentations sections is set to present the respective information in a grid form based on time and broadcast station, and
the index includes a date that is associated with the information of the respective presentation section.

18. The medium of claim 1, wherein the stored instructions are further configured to cause the information processing apparatus to execute switching the displayed at least one of the plurality of presentation sections and the displayed indexes to a three-dimensional display from a two-dimensional display or to a two-dimensional display from a three-dimensional display.

19. The medium of claim 1, wherein the displayed at least one of the plurality of presentation sections and the displayed indexes and displayed through a virtual camera and the stored instructions are further configured to cause the information processing apparatus to execute:
changing a location of the virtual camera based on input from a user input device; and
adjusting the display characteristic of displayed indexes based on the location.

20. An information processing apparatus configured to output information and a plurality of presentation sections to a display, the plurality of presentation sections including an index portion and a content portion, the content portion of each one of the plurality of presentation sections including at least some of the information, the apparatus comprising:
a processing system configured to:
output to display the content portion of one of the plurality of presentation sections;
output to the display the indexes of a remainder of the plurality of presentation sections;
receive a search condition;
search the information based on the search condition to identify matching information;
change a display characteristic of the matching information when the matching information is included in the content portion of the one of the plurality of presentation sections that is output; and
change a display characteristic of the output indexes that are associated with presentation sections based on a result of the matching information.

21. A computer implemented method for use with a computing system including at least one processor that is configured to process content information and a graphics processor configured to output at least first and second content presentation sections to a display device, the first and second content presentations sections including, respectively, first and second subsets of the content information, the method comprising:
displaying the first content presentation section;
displaying an index marker that is associated with the second content presentation section;
searching the content information based on a search criteria;
changing a display characteristic of the first content presentation section when a match to the search criteria is found within the first subset of content information; and
changing a display characteristic of the index marker when a match to the search criteria is found within the second subset of content information.

22. An information processing system configured to process content information, the content information including first and second subsets of content, the system comprising:
at least one processor configured to:
output, to a display, a first presentation section, the first presentation section including the first subset of content;
output, to a display, an index marker that is associated with a second presentation section, the second presentation section including the second subset of content;
search the content information based on a search criteria;
change a display characteristic of the first presentation section when a match to the search criteria is found within the first subset of content; and
change a display characteristic of the index marker when a match to the search criteria is found within the second subset of content.

23. The system of claim 22, wherein that at least one processor configured to:
not output a second index marker that is associated with the first presentation section when the first presentation section is output; and
not output the second presentation section when the index marker is output.

* * * * *